(12) United States Patent
Leteux et al.

(10) Patent No.: US 11,430,009 B2
(45) Date of Patent: Aug. 30, 2022

(54) SYSTEM AND METHOD OF OPTIMIZING MATCHING OF LEADS

(71) Applicant: LMB MORTGAGE SERVICES, INC., Playa Vista, CA (US)

(72) Inventors: Doug Leteux, Santa Monica, CA (US); Kanaya J. Nagdev, Redondo Beach, CA (US); Dmitry Kuzmenko, Los Angeles, CA (US)

(73) Assignee: LMB Mortgage Services, Inc., Playa Vista, CA (US)

( * ) Notice: Subject to any disclaimer, the term of this patent is extended or adjusted under 35 U.S.C. 154(b) by 279 days.

(21) Appl. No.: 16/573,821

(22) Filed: Sep. 17, 2019

(65) Prior Publication Data
US 2020/0082439 A1 Mar. 12, 2020

Related U.S. Application Data

(63) Continuation of application No. 14/820,231, filed on Aug. 6, 2015, now Pat. No. 10,453,093, which is a
(Continued)

(51) Int. Cl.
| G06Q 30/02 | (2012.01) |
| G06Q 30/06 | (2012.01) |
| G06Q 40/02 | (2012.01) |

(52) U.S. Cl.
CPC ..... *G06Q 30/0255* (2013.01); *G06Q 30/0609* (2013.01); *G06Q 30/0611* (2013.01); *G06Q 40/025* (2013.01)

(58) Field of Classification Search
CPC ..... G06Q 30/0255; G06Q 30/06–0645; G06Q 30/08; G06Q 40/025; G06Q 50/01; G16Y 10/00–90
See application file for complete search history.

(56) References Cited

U.S. PATENT DOCUMENTS

| 4,982,346 A | 1/1991 | Girouard et al. |
| 5,056,019 A | 10/1991 | Schultz et al. |

(Continued)

FOREIGN PATENT DOCUMENTS

| GB | 2 384 087 | 7/2003 |
| GB | 2 392 748 | 3/2004 |

(Continued)

OTHER PUBLICATIONS

"Anchor Launches LeadVerifier to Verify, Correct and Enhance Internet Leads", PR Web: Press Release Newswire, Farmingdale, NY, Aug. 8, 2005, pp. 2.

(Continued)

*Primary Examiner* — Adam L Levine
(74) *Attorney, Agent, or Firm* — Knobbe Martens Olson & Bear LLP

(57) ABSTRACT

One disclosed system includes a processor, a network interface in communication with the processor, a data storage device in communication with the processor, and computer-executable instructions stored in computer storage. The instructions are configured, when executed by the processor, to cause computer hardware to perform operations comprising: (1) matching a consumer lead comprising information about a consumer with one or more vendors selected from a set of vendors identified in data records stored on the data storage device; (2) sending, via the network interface, the lead to the matched vendors; (3) receiving a real-time indication of a rejection from one of the matched vendors; (4) matching the lead with a replacement vendor; and (5) sending the lead to the replacement vendor.

20 Claims, 9 Drawing Sheets

Related U.S. Application Data continuation of application No. 13/073,878, filed on Mar. 28, 2011, now abandoned.

(60) Provisional application No. 61/330,285, filed on Apr. 30, 2010.

(56) References Cited

U.S. PATENT DOCUMENTS

| | | | |
|---|---|---|---|
| 5,353,218 A | 10/1994 | DeLapa et al. |
| 5,454,030 A | 9/1995 | de Oliveira et al. |
| 5,459,306 A | 10/1995 | Stein et al. |
| 5,504,675 A | 4/1996 | Cragun et al. |
| 5,521,813 A | 5/1996 | Fox et al. |
| 5,583,763 A | 12/1996 | Atcheson et al. |
| 5,621,812 A | 4/1997 | Deaton et al. |
| 5,628,004 A | 5/1997 | Gormley et al. |
| 5,649,114 A | 7/1997 | Deaton et al. |
| 5,692,107 A | 11/1997 | Simoudis et al. |
| 5,696,907 A | 12/1997 | Tom |
| 5,745,654 A | 4/1998 | Titan |
| 5,774,868 A | 6/1998 | Cragun et al. |
| 5,774,870 A | 6/1998 | Storey |
| 5,794,210 A | 8/1998 | Goldhaber et al. |
| 5,802,142 A | 9/1998 | Browne |
| 5,819,226 A | 10/1998 | Gopinathan et al. |
| 5,819,291 A | 10/1998 | Haimowitz et al. |
| 5,842,178 A | 11/1998 | Giovannoli |
| 5,857,175 A | 1/1999 | Day et al. |
| 5,864,822 A | 1/1999 | Baker, III |
| 5,878,403 A | 3/1999 | DeFrancesco et al. |
| 5,884,287 A | 3/1999 | Edesess |
| 5,884,289 A | 3/1999 | Anderson et al. |
| 5,926,800 A | 7/1999 | Baronowski et al. |
| 5,930,764 A | 7/1999 | Melchione et al. |
| 5,933,813 A | 8/1999 | Teicher et al. |
| 5,953,707 A | 9/1999 | Huang et al. |
| 6,009,415 A | 12/1999 | Shurling et al. |
| 6,029,139 A | 2/2000 | Cunningham et al. |
| 6,029,149 A | 2/2000 | Dykstra et al. |
| 6,029,154 A | 2/2000 | Pettitt |
| 6,067,525 A | 5/2000 | Johnson et al. |
| 6,078,892 A | 6/2000 | Anderson et al. |
| 6,094,643 A | 7/2000 | Anderson et al. |
| 6,119,103 A | 9/2000 | Basch et al. |
| 6,208,979 B1 | 3/2001 | Sinclair |
| 6,233,566 B1 | 5/2001 | Levine |
| 6,254,000 B1 | 7/2001 | Degen et al. |
| 6,269,325 B1 | 7/2001 | Lee et al. |
| 6,282,517 B1 | 8/2001 | Wolfe et al. |
| 6,321,205 B1 | 11/2001 | Eder |
| 6,324,524 B1 | 11/2001 | Lent et al. |
| 6,330,546 B1 | 12/2001 | Gopinathan et al. |
| 6,385,594 B1 | 5/2002 | Lebda et al. |
| 6,393,406 B1 | 5/2002 | Eder |
| 6,418,436 B1 | 7/2002 | Degen et al. |
| 6,430,539 B1 | 8/2002 | Lazarus et al. |
| 6,448,898 B1 | 9/2002 | Kasik |
| 6,513,018 B1 | 1/2003 | Culhane |
| 6,529,878 B2 | 3/2003 | De Rafael et al. |
| 6,542,894 B1 | 4/2003 | Lee et al. |
| 6,597,775 B2 | 7/2003 | Lawyer et al. |
| 6,611,816 B2 | 8/2003 | Lebda et al. |
| 6,615,193 B1 | 9/2003 | Kingdon et al. |
| 6,714,918 B2 | 3/2004 | Hillmer et al. |
| 6,782,390 B2 | 8/2004 | Lee et al. |
| 6,823,319 B1 | 11/2004 | Lynch et al. |
| 6,839,682 B1 | 1/2005 | Blume et al. |
| 6,850,606 B2 | 2/2005 | Lawyer et al. |
| 6,868,389 B1 | 3/2005 | Wilkins et al. |
| 6,873,979 B2 | 3/2005 | Fishman et al. |
| 6,901,406 B2 | 5/2005 | Nabe et al. |
| 6,925,441 B1 | 8/2005 | Jones, III et al. |
| 7,006,614 B2 | 2/2006 | Feinberg et al. |
| 7,028,052 B2 | 4/2006 | Chapman et al. |
| 7,035,699 B1 | 4/2006 | Anderson et al. |
| 7,043,531 B1 | 5/2006 | Seibel et al. |
| 7,047,251 B2 | 5/2006 | Reed et al. |
| 7,096,205 B2 | 8/2006 | Hansen et al. |
| 7,096,220 B1 | 8/2006 | Seibel et al. |
| 7,136,448 B1 | 11/2006 | Venkataperumal et al. |
| 7,139,732 B1 | 11/2006 | Desenberg |
| 7,212,995 B2 | 5/2007 | Schulkins |
| 7,228,284 B1 | 6/2007 | Vaillancourt et al. |
| 7,234,156 B2 | 6/2007 | French et al. |
| 7,263,506 B2 | 8/2007 | Lee et al. |
| 7,277,875 B2 | 10/2007 | Serrano-Morales et al. |
| 7,283,974 B2 | 10/2007 | Katz et al. |
| 7,296,734 B2 | 11/2007 | Pliha |
| 7,305,364 B2 | 12/2007 | Nabe et al. |
| 7,314,167 B1 | 1/2008 | Kiliccote |
| 7,333,976 B1 | 2/2008 | Auerbach et al. |
| 7,340,410 B1 | 3/2008 | Vaillancourt et al. |
| 7,343,149 B2 | 3/2008 | Benco |
| 7,379,913 B2 | 5/2008 | Steele et al. |
| 7,383,215 B1 | 6/2008 | Navarro et al. |
| 7,428,509 B2 | 9/2008 | Klebanoff |
| 7,433,855 B2 | 10/2008 | Gavan et al. |
| 7,458,508 B1 | 12/2008 | Shao et al. |
| 7,509,117 B2 | 3/2009 | Yum |
| 7,512,221 B2 | 3/2009 | Toms |
| 7,542,993 B2 | 6/2009 | Satterfield et al. |
| 7,546,243 B2 | 6/2009 | Kapadia et al. |
| 7,548,886 B2 | 6/2009 | Kirkland et al. |
| 7,556,192 B2 | 7/2009 | Wokaty, Jr. |
| 7,562,184 B2 | 7/2009 | Henmi et al. |
| 7,562,814 B1 | 7/2009 | Shao |
| 7,575,157 B2 | 8/2009 | Barnhardt et al. |
| 7,581,112 B2 | 8/2009 | Brown et al. |
| 7,610,216 B1 | 10/2009 | May et al. |
| 7,620,596 B2 | 11/2009 | Knudson et al. |
| 7,623,844 B2 | 11/2009 | Herrmann et al. |
| 7,630,933 B2 | 12/2009 | Peterson et al. |
| 7,657,569 B1 | 2/2010 | Semprevivo et al. |
| 7,664,668 B2 | 2/2010 | Lissy et al. |
| 7,668,725 B2 | 2/2010 | Alston |
| 7,668,769 B2 | 2/2010 | Baker et al. |
| 7,672,865 B2 | 3/2010 | Kumar et al. |
| 7,686,214 B1 | 3/2010 | Shao et al. |
| 7,690,032 B1 | 3/2010 | Peirce |
| 7,708,190 B2 | 5/2010 | Brandt et al. |
| 7,725,300 B2 | 5/2010 | Pinto et al. |
| 7,752,054 B1 | 7/2010 | Anthony-Hoppe et al. |
| 7,752,236 B2 | 7/2010 | Williams et al. |
| 7,761,384 B2 | 7/2010 | Madhogarhia |
| 7,778,885 B1 * | 8/2010 | Semprevivo ......... G06Q 40/025 705/26.1 |
| 7,788,147 B2 | 8/2010 | Haggerty et al. |
| 7,788,152 B2 | 8/2010 | Haggerty et al. |
| 7,793,835 B1 | 9/2010 | Coggeshall et al. |
| 7,801,811 B1 | 9/2010 | Merrell et al. |
| 7,801,843 B2 | 9/2010 | Kumar et al. |
| 7,802,104 B2 | 9/2010 | Dickinson |
| 7,805,362 B1 | 9/2010 | Merrell et al. |
| 7,827,115 B2 | 11/2010 | Weller et al. |
| 7,856,494 B2 | 12/2010 | Kulkarni |
| 7,912,770 B2 | 3/2011 | Haggerty et al. |
| 7,954,698 B1 | 6/2011 | Pliha |
| 7,962,347 B2 | 6/2011 | Anthony-Hoppe et al. |
| 7,962,501 B1 | 6/2011 | Semprevivo et al. |
| 7,970,672 B2 | 6/2011 | Mendelovich et al. |
| 7,970,690 B2 | 6/2011 | Diana et al. |
| 7,991,689 B1 | 8/2011 | Brunzell et al. |
| 8,060,424 B2 | 11/2011 | Kasower |
| 8,135,607 B2 | 3/2012 | Williams et al. |
| 8,175,966 B2 | 5/2012 | Steinberg et al. |
| 8,214,262 B1 | 7/2012 | Semprevivo et al. |
| 8,271,313 B2 | 9/2012 | Williams et al. |
| 8,285,656 B1 | 10/2012 | Chang et al. |
| 8,346,658 B1 | 1/2013 | Curry et al. |
| 8,533,002 B2 | 9/2013 | Mesaros |
| 8,533,038 B2 | 9/2013 | Bergh et al. |
| 8,566,141 B1 | 10/2013 | Nagdev et al. |
| 8,606,626 B1 | 12/2013 | DeSoto |
| 8,688,724 B1 | 4/2014 | Semprevivo et al. |

(56) References Cited

U.S. PATENT DOCUMENTS

| | | |
|---|---|---|
| 9,110,916 B1 | 8/2015 | Semprevivo et al. |
| 9,665,885 B1 | 5/2017 | Allouche |
| 10,204,141 B1 | 2/2019 | Semprevivo |
| 10,255,610 B1 * | 4/2019 | Semprevivo ....... G06Q 30/0601 |
| 10,373,198 B1 | 8/2019 | Cook et al. |
| 10,453,093 B1 | 10/2019 | Leteux et al. |
| 10,565,617 B2 | 2/2020 | Cook et al. |
| 10,977,675 B2 | 4/2021 | Semprevivo et al. |
| 11,106,677 B2 | 8/2021 | Semprevivo et al. |
| 2001/0014868 A1 | 8/2001 | Herz et al. |
| 2001/0035972 A1 | 11/2001 | Wurmfeld |
| 2001/0047289 A1 | 11/2001 | Mckee et al. |
| 2002/0007343 A1 | 1/2002 | Oyama et al. |
| 2002/0035504 A1 | 3/2002 | Dver et al. |
| 2002/0035568 A1 | 3/2002 | Benthin et al. |
| 2002/0038312 A1 | 3/2002 | Donner et al. |
| 2002/0059095 A1 | 5/2002 | Cook |
| 2002/0072975 A1 | 6/2002 | Steele et al. |
| 2002/0077964 A1 | 6/2002 | Brody et al. |
| 2002/0077998 A1 | 6/2002 | Andrews et al. |
| 2002/0082892 A1 | 6/2002 | Reffel et al. |
| 2002/0087460 A1 | 7/2002 | Hornung |
| 2002/0099649 A1 | 7/2002 | Lee et al. |
| 2002/0128960 A1 | 9/2002 | Lambiotte et al. |
| 2002/0136381 A1 | 9/2002 | Shaffer et al. |
| 2002/0143620 A1 | 10/2002 | Kraus |
| 2002/0147695 A1 | 10/2002 | Khedkar et al. |
| 2002/0161711 A1 | 10/2002 | Sartor et al. |
| 2002/0188511 A1 | 12/2002 | Johnson et al. |
| 2002/0194050 A1 | 12/2002 | Nabe et al. |
| 2003/0009426 A1 | 1/2003 | Ruiz-Sanchez |
| 2003/0050882 A1 | 3/2003 | Degen et al. |
| 2003/0061163 A1 | 3/2003 | Durfield |
| 2003/0065563 A1 | 4/2003 | Elliott et al. |
| 2003/0065620 A1 | 4/2003 | Gailey et al. |
| 2003/0078877 A1 | 4/2003 | Beirne et al. |
| 2003/0097320 A1 | 5/2003 | Gordon |
| 2003/0097329 A1 | 5/2003 | Nabe et al. |
| 2003/0115133 A1 | 6/2003 | Bian |
| 2003/0158751 A1 | 8/2003 | Suresh et al. |
| 2003/0163363 A1 | 8/2003 | Pratte et al. |
| 2003/0172002 A1 | 9/2003 | Spira et al. |
| 2003/0182214 A1 | 9/2003 | Taylor |
| 2003/0195830 A1 | 10/2003 | Merkoulovitch et al. |
| 2003/0195859 A1 | 10/2003 | Lawrence |
| 2003/0212618 A1 | 11/2003 | Keyes et al. |
| 2003/0217003 A1 | 11/2003 | Weinflash et al. |
| 2003/0220858 A1 | 11/2003 | Lam et al. |
| 2003/0225692 A1 | 12/2003 | Bosch et al. |
| 2003/0229504 A1 | 12/2003 | Hollister |
| 2004/0030667 A1 | 2/2004 | Xu et al. |
| 2004/0039686 A1 | 2/2004 | Klebanoff |
| 2004/0044615 A1 | 3/2004 | Xue et al. |
| 2004/0044617 A1 | 3/2004 | Lu |
| 2004/0052357 A1 | 3/2004 | Logan et al. |
| 2004/0054619 A1 | 3/2004 | Watson et al. |
| 2004/0064401 A1 | 4/2004 | Palaghita et al. |
| 2004/0064402 A1 | 4/2004 | Dreyer et al. |
| 2004/0078323 A1 | 4/2004 | Johnston et al. |
| 2004/0100964 A1 | 5/2004 | Robotham et al. |
| 2004/0107132 A1 | 6/2004 | Honarvar et al. |
| 2004/0111305 A1 | 6/2004 | Gavan et al. |
| 2004/0111312 A1 | 6/2004 | Ingman et al. |
| 2004/0111363 A1 | 6/2004 | Trench et al. |
| 2004/0117235 A1 | 6/2004 | Shacham |
| 2004/0122730 A1 | 6/2004 | Tucciarone et al. |
| 2004/0143482 A1 | 7/2004 | Tivey et al. |
| 2004/0143483 A1 | 7/2004 | Tivey et al. |
| 2004/0167793 A1 | 8/2004 | Masuoka et al. |
| 2004/0177030 A1 | 9/2004 | Shoham |
| 2004/0177046 A1 | 9/2004 | Ogram |
| 2004/0193535 A1 | 9/2004 | Barazesh |
| 2004/0199462 A1 | 10/2004 | Starrs |
| 2004/0205080 A1 | 10/2004 | Patel |
| 2004/0205157 A1 | 10/2004 | Bibelnieks et al. |
| 2004/0230448 A1 | 11/2004 | Schaich |
| 2004/0230527 A1 | 11/2004 | Hansen et al. |
| 2004/0243518 A1 | 12/2004 | Clifton et al. |
| 2005/0021476 A1 | 1/2005 | Candella et al. |
| 2005/0027632 A1 | 2/2005 | Zeitoun et al. |
| 2005/0027983 A1 | 2/2005 | Klawon |
| 2005/0038688 A1 | 2/2005 | Collins et al. |
| 2005/0044036 A1 | 2/2005 | Harrington et al. |
| 2005/0058262 A1 | 3/2005 | Timmins et al. |
| 2005/0065809 A1 | 3/2005 | Henze |
| 2005/0065874 A1 | 3/2005 | Lefner et al. |
| 2005/0075987 A1 | 4/2005 | Pintsov et al. |
| 2005/0080821 A1 | 4/2005 | Breil et al. |
| 2005/0097051 A1 | 5/2005 | Madill, Jr. et al. |
| 2005/0102226 A1 | 5/2005 | Oppenheimer et al. |
| 2005/0108041 A1 | 5/2005 | White |
| 2005/0125350 A1 | 6/2005 | Tidwell et al. |
| 2005/0130704 A1 | 6/2005 | McParland et al. |
| 2005/0131760 A1 | 6/2005 | Manning et al. |
| 2005/0144067 A1 | 6/2005 | Farahat et al. |
| 2005/0154648 A1 | 7/2005 | Strause |
| 2005/0154664 A1 | 7/2005 | Guy et al. |
| 2005/0154665 A1 | 7/2005 | Kerr |
| 2005/0171859 A1 | 8/2005 | Harrington et al. |
| 2005/0182774 A1 | 8/2005 | Weir et al. |
| 2005/0187860 A1 | 8/2005 | Peterson et al. |
| 2005/0209922 A1 | 9/2005 | Hofmeister |
| 2005/0222906 A1 | 10/2005 | Chen |
| 2005/0256809 A1 | 11/2005 | Sadri |
| 2005/0267812 A1 | 12/2005 | Jensen et al. |
| 2005/0273442 A1 | 12/2005 | Bennett et al. |
| 2005/0278246 A1 | 12/2005 | Friedman et al. |
| 2005/0278542 A1 | 12/2005 | Pierson et al. |
| 2005/0279824 A1 | 12/2005 | Anderson et al. |
| 2006/0004731 A1 | 1/2006 | Seibel et al. |
| 2006/0041464 A1 | 2/2006 | Powers et al. |
| 2006/0041500 A1 | 2/2006 | Diana et al. |
| 2006/0059073 A1 | 3/2006 | Walzak |
| 2006/0059110 A1 | 3/2006 | Madhok et al. |
| 2006/0064340 A1 | 3/2006 | Cook |
| 2006/0074986 A1 | 4/2006 | Mallalieu et al. |
| 2006/0080230 A1 | 4/2006 | Freiberg |
| 2006/0080263 A1 | 4/2006 | Willis et al. |
| 2006/0100944 A1 | 5/2006 | Reddin et al. |
| 2006/0106668 A1 | 5/2006 | Kim et al. |
| 2006/0129422 A1 | 6/2006 | Kim et al. |
| 2006/0129428 A1 | 6/2006 | Wennberg |
| 2006/0129481 A1 | 6/2006 | Bhatt et al. |
| 2006/0131390 A1 | 6/2006 | Kim |
| 2006/0143695 A1 | 6/2006 | Grynberg |
| 2006/0161435 A1 | 7/2006 | Atef et al. |
| 2006/0173776 A1 | 8/2006 | Shalley et al. |
| 2006/0178971 A1 | 8/2006 | Owen et al. |
| 2006/0184381 A1 * | 8/2006 | Rice ................... G06Q 30/0601 705/26.1 |
| 2006/0184417 A1 | 8/2006 | Van der Linden et al. |
| 2006/0204051 A1 | 9/2006 | Holland, IV |
| 2006/0229961 A1 | 10/2006 | Lyftogt et al. |
| 2006/0239512 A1 | 10/2006 | Petrillo |
| 2006/0242000 A1 | 10/2006 | Giguiere |
| 2006/0242046 A1 | 10/2006 | Haggerty et al. |
| 2006/0253358 A1 | 11/2006 | Delgrosso et al. |
| 2006/0262929 A1 | 11/2006 | Vatanen et al. |
| 2006/0265243 A1 | 11/2006 | Racho et al. |
| 2006/0265259 A1 | 11/2006 | Diana et al. |
| 2006/0271456 A1 | 11/2006 | Romain et al. |
| 2006/0271457 A1 | 11/2006 | Romain et al. |
| 2007/0005508 A1 | 1/2007 | Chiang |
| 2007/0016522 A1 | 1/2007 | Wang |
| 2007/0033227 A1 | 2/2007 | Gaito |
| 2007/0038483 A1 | 2/2007 | Wood |
| 2007/0038516 A1 | 2/2007 | Apple et al. |
| 2007/0059442 A1 | 3/2007 | Sabeta |
| 2007/0067234 A1 | 3/2007 | Beech et al. |
| 2007/0067297 A1 | 3/2007 | Kublickis |
| 2007/0072190 A1 | 3/2007 | Aggarwal |
| 2007/0078985 A1 | 4/2007 | Shao et al. |
| 2007/0083460 A1 | 4/2007 | Bachenheimer |
| 2007/0093234 A1 | 4/2007 | Willis et al. |

(56) References Cited

U.S. PATENT DOCUMENTS

| | | |
|---|---|---|
| 2007/0094137 A1 | 4/2007 | Phillips et al. |
| 2007/0106582 A1 | 5/2007 | Baker et al. |
| 2007/0112582 A1 | 5/2007 | Fenlon |
| 2007/0112667 A1 | 5/2007 | Rucker |
| 2007/0118435 A1 | 5/2007 | Ran |
| 2007/0150372 A1 | 6/2007 | Schoenberg |
| 2007/0192248 A1 | 8/2007 | West |
| 2007/0205266 A1 | 9/2007 | Carr et al. |
| 2007/0214076 A1 | 9/2007 | Robida et al. |
| 2007/0220003 A1 | 9/2007 | Chern et al. |
| 2007/0226093 A1 | 9/2007 | Chan et al. |
| 2007/0233559 A1 | 10/2007 | Golec |
| 2007/0233561 A1 | 10/2007 | Golec |
| 2007/0239721 A1 | 10/2007 | Ullman et al. |
| 2007/0244807 A1 | 10/2007 | Andringa et al. |
| 2007/0288355 A1 | 12/2007 | Roland et al. |
| 2007/0288559 A1 | 12/2007 | Parsadayan |
| 2007/0299609 A1 | 12/2007 | Garin et al. |
| 2007/0299771 A1 | 12/2007 | Brody et al. |
| 2008/0010687 A1 | 1/2008 | Gonen et al. |
| 2008/0015887 A1 | 1/2008 | Drabek et al. |
| 2008/0033869 A1 | 2/2008 | Steele et al. |
| 2008/0066188 A1 | 3/2008 | Kwak |
| 2008/0077526 A1 | 3/2008 | Arumugam |
| 2008/0091535 A1 | 4/2008 | Heiser et al. |
| 2008/0103800 A1 | 5/2008 | Domenikos et al. |
| 2008/0103960 A1 | 5/2008 | Sweeney |
| 2008/0103972 A1 | 5/2008 | Lanc |
| 2008/0109444 A1 | 5/2008 | Williams et al. |
| 2008/0109445 A1 | 5/2008 | Williams et al. |
| 2008/0120155 A1 | 5/2008 | Pliha |
| 2008/0126233 A1 | 5/2008 | Hogan |
| 2008/0147454 A1 | 6/2008 | Walker et al. |
| 2008/0167883 A1 | 7/2008 | Khazaneh |
| 2008/0175360 A1 | 7/2008 | Schwarz et al. |
| 2008/0255992 A1 | 10/2008 | Lin |
| 2008/0270292 A1 | 10/2008 | Ghosh et al. |
| 2008/0275916 A1 | 11/2008 | Bohannon |
| 2008/0281737 A1 | 11/2008 | Fajardo |
| 2008/0281756 A1 | 11/2008 | Riise et al. |
| 2008/0288361 A1 | 11/2008 | Rego et al. |
| 2008/0288382 A1 | 11/2008 | Smith et al. |
| 2008/0294540 A1 | 11/2008 | Celka et al. |
| 2008/0300962 A1 | 12/2008 | Cawston et al. |
| 2009/0044279 A1 | 2/2009 | Crawford et al. |
| 2009/0106150 A1 | 4/2009 | Pelegero et al. |
| 2009/0106846 A1 | 4/2009 | Dupray et al. |
| 2009/0125369 A1 | 5/2009 | Kloostra et al. |
| 2009/0126013 A1 | 5/2009 | Atwood et al. |
| 2009/0144160 A1 | 6/2009 | Haggerty et al. |
| 2009/0144185 A1 | 6/2009 | Haggerty et al. |
| 2009/0182653 A1 | 7/2009 | Zimiles |
| 2009/0199264 A1 | 8/2009 | Lang |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0228339 A1* | 9/2009 | Wolf ................. G06Q 30/0601 705/36 R |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0254476 A1 | 10/2009 | Sharma et al. |
| 2009/0307104 A1 | 12/2009 | Weng |
| 2010/0023447 A1 | 1/2010 | Mac Innis |
| 2010/0043055 A1 | 2/2010 | Baumgart |
| 2010/0094768 A1 | 4/2010 | Miltonberger |
| 2010/0100945 A1 | 4/2010 | Ozzie et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0145836 A1 | 6/2010 | Baker et al. |
| 2010/0205662 A1 | 8/2010 | Ibrahim et al. |
| 2010/0229245 A1 | 9/2010 | Singhal |
| 2010/0234708 A1 | 9/2010 | Buck et al. |
| 2010/0250364 A1 | 9/2010 | Song et al. |
| 2011/0004498 A1 | 1/2011 | Readshaw |
| 2011/0016042 A1 | 1/2011 | Cho et al. |
| 2011/0047071 A1 | 2/2011 | Choudhuri et al. |
| 2011/0093383 A1 | 4/2011 | Haggerty et al. |
| 2011/0112958 A1 | 5/2011 | Haggerty et al. |
| 2011/0137730 A1 | 6/2011 | McCamey et al. |
| 2011/0238477 A1 | 9/2011 | Urbanski |
| 2012/0197762 A1 | 8/2012 | Steinberg et al. |
| 2013/0245472 A1 | 9/2013 | Eveland |
| 2014/0032259 A1 | 1/2014 | LaFever et al. |
| 2014/0032406 A1 | 1/2014 | Roach et al. |
| 2014/0229334 A1 | 8/2014 | Shirk et al. |
| 2014/0344080 A1 | 11/2014 | Rothman et al. |
| 2018/0083843 A1 | 3/2018 | Sambandam |
| 2019/0259046 A1 | 8/2019 | Semprevivo et al. |
| 2019/0272272 A1 | 9/2019 | Semprevivo et al. |
| 2020/0167822 A1 | 5/2020 | Cook et al. |

FOREIGN PATENT DOCUMENTS

| | | |
|---|---|---|
| JP | 2003-016261 | 1/2003 |
| TW | 256569 | 6/2006 |
| WO | WO 91/03789 | 3/1991 |
| WO | WO 97/023838 | 7/1997 |
| WO | WO 99/033012 | 7/1999 |
| WO | WO 99/046710 | 9/1999 |
| WO | WO 02/027610 | 4/2002 |
| WO | WO 03/071388 | 8/2003 |
| WO | WO 2004/046882 | 6/2004 |
| WO | WO 2005/036859 | 4/2005 |
| WO | WO 2006/110873 | 10/2006 |
| WO | WO 2008/057853 | 5/2008 |

OTHER PUBLICATIONS

Authenticom, "What's in a Name?", downloaded from http://web.archive.org/web/20070708185835/http://www.authenticom.com/story.html, 1 page, Apr. 1, 2009.

Authenticom, Technical Specs, "Confidence Level Indicators (CLI)", downloaded from http://www.authenticom.com/confidence_level_indicators.shtml, 2 pages, Aug. 17, 2006.

Bharadwaj et al., "Sustainable Competitive Advantage in Service Industries: A Conceptual Model and Research Propositions", Journal of Marketing, Oct. 1993, vol. 57, No. 4, pp. 83-99.

Bitran et al., "Mailing Decisions in Catalog Sales Industry", Management Science (JSTOR), vol. 42, No. 9, pp. 1364-1381, Sep. 1996.

Caliendo, et al.; "Some Practical Guidance for the Implementation of Propensity Score Matching"; IZA:Discussion Paper Series; No. 1588; Germany; May 2005.

Channelwave.com, PRM Central—About PRM, http://web.archive.org/web/20000510214859//http://www.channelwave.com as printed on Jun. 21, 2006, May 2000 Archive.

Chores & Allowances. "Do Kids Have Credit Reports?", Oct. 15, 2007, http://choresandallowances.blogspot.com/2007/10/do-kids-have-credit-reports.html.

Chung, Charles, "Multi-Channel Retailing Requires the Cleanest Data—But Don't Expect it From the Customer", Internet Retailer, Jan./Feb. 2002, pp. 61-62.

Cowie, Norman, Warning Bells & "The Bust-Out", Business Credit, Jul. 1, 2000.

Dymi, Amilda, Need for Leads Spurs Some Upgrades, Origination News-Special Report, May 1, 2008, vol. vol. 17, Issue No. 8, pp. p. 24, Atlanta, Copyright 2008 SourceMedia, Inc.

(56) References Cited

OTHER PUBLICATIONS

EFunds Corporation, Data & Decisioning, Debit Report, as printed on Apr. 1, 2007, http://www.efunds.com/web/industry-solutions/financial-services/frm-debit-report/htm, 1 page.
EFunds Introduces QualiFileSM; Deluxe Corporation; Sep. 1999; Milwaukee, WI.
Erschik, Richard, Sales Leads Can Truly Be Seeds of Sales, The Journal of Business & Industrial Marketing, Summer/Fall 1989, vol. vol. 4, Issue No. 2.
Fair Isaac Introduces Falcon One System to Combat Fraud, Business Wire, May 5, 2005.
Fair Isaac Offers New Fraud Tool, National Mortgage News & Source Media, Inc., Jun. 13, 2005.
Finextra, Basepoint Analytics Introduces Predictive Technology for Mortgage Fraud, May 10, 2005.
Gibbs, Adrienne; "Protecting Your Children from Identity Theft," Nov. 25, 2008, http://www.creditcards.com/credit-card-news/identity-ID-theft-and-kids-children-1282.php.
Greco, Susan, The Rating Game: Grade you Leads to Clear the Pipe Dreams from you Sales Pipeline, Online Reprint, Jan. 1998, vol. vol. 20, Issue No. 1, pp. p. 93 (1-3).
Griggs, Robyn, Give us Leads! Give us Leads!, Sales and Marketing Management, Jul. 1997, vol. 149, Issue 7, pp. ABI/Inform Global, p. 66.
Hennessey, Hubert D., Software Propels the Selling Cycle, Software Magazine, Jun. 1988, vol. 8, Issue 8, pp. ABI/Inform Global p. 57-64.
ID Theft Assist, "Do You Know Where Your Child's Credit Is?", Nov. 26, 2007, http://www.idtheftassist.com/pages/story14.
"Impac Funding Introduces Enhanced Website for Static Pool Tracking of MBS Transactions," Webpage printed out from http://www.lewtan.com/press/1208044_Impac-Lewtan.htm on Mar. 20, 2008.
Industry News, New Technology Identifies Mortgage Fraud: Basepoint Analytics Launches FraudMark, Inman News, Oct. 5, 2005, American Land Title Association.
"Intelligent Miner Applications Guide"; Chapters 4-7; pp. 33-132; IBM Corp., Apr. 2, 1999.
International Search Report and Written Opinion for PCT/US/2007/006070, dated Nov. 10, 2008.
International Search Report and Written Opinion for PCT/US2007/083055, dated Jan. 7, 2009.
International Search Report and Written Opinion for PCT/US2007/63823, dated Oct. 24, 2007.
International Search Report and Written Opinion for PCT/US2007/63824, dated Oct. 9, 2007.
International Search Report and Written Opinion for PCT/US2008/064594, dated Oct. 30, 2008.
International Search Report and Written Opinion for PCT/US2007/63822, dated Sep. 11, 2007.
Jacob et al., A Case Study of Checking Account Inquiries and Closures in Chicago, The Center for Financial Services Innovation, Nov. 2006.
Lamons, Bob; Be Smart: Offer Inquiry Qualification Services, Marketing News, Nov. 6, 1995, vol. 29, No. 23, ABI/Inform Global, p. 13.
Leadmaster; http://web.archive.org/web/20001206021800/http://leadmaster.com/index.html as printed on Jan. 18, 2006, Dec. 2000.
Lifelock, "How LifeLock Works," http://www.lifelock.com/lifelock-for-people, accessed Mar. 14, 2008.
Lifelock, "LifeLock Launches First ID Theft Prevention Program for the Protection of Children," Oct. 14, 2005 Press Release, posted on http://www.lifelock.com/about-us/press-room/2005-press-releases/lifelock-protection-for-children.
LifeLock; "How can LifeLock protect my kids and family?," http://www.lifelock.com/lifelock-for-people/how-we-do-it/how-can-lifelock-protect-my-kids-and-family, accessed Mar. 14, 2008.
Loshin, Intelligent Enterprise: Better Insight for Business Decisions, "Value-Added Data: Merge Ahead", Feb. 9, 2000, vol. 3, No. 3, 5 pages.
LowerMyBills, Inc., "Lower Your Mortgage with a Lender You Can Trust" http://web.archive.org/web/20071110203156/http://www.lowermybills.com/ dated Nov. 10, 2007 in 11 pages.
MarketSoft.com, Turning Inquiries into Revenue: Leads are the Key, eLeads MarketSoft http://web.archive.org/web/20000309005815/marketsoft.com.product.index.htm as printed on Jun. 22, 2006, Feb. 2000.
Otter, et al., "Direct Mail Selection by Joint Modeling of the Probability and Quantity of Response", Jun. 1997, pp. 14.
Polatoglu et al., "Theory and Methodology, Probability Distributions of Cost, Revenue and Profit over a Warranty Cycle", European Journal of Operational Research, vol. 108, Issue 1, Jul. 1998, pp. 170-183.
"PrimeQ Lead Validation Techniques Gets Stronger", http://66.102.7.104/search?q=cache.qXAdm0EXcwYJ:www.primeg.com/absolutenm/anmv in 2 pages, Nov. 29, 2005.
RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007, pp. 2.
Real IQ, "Lead Metrix", downloaded from http://www.realiq.com/leadmetrix.html, 1 page, Aug. 17, 2006.
Real IQ, "Mortgage Industry", downloaded from http://www.realiq.com/mortgage.html, 4 pages, Aug. 17, 2006.
Real IQ, RealIQ.com, retrieved from web.archive.org http://replay.web.archive.org/20051212152337/http://www.realiq.com/mortgage.html as printed on Apr. 28, 2011, 2 pgs.
SalesLogix.Net, SalesLogix Sales Tour, http://web.archive.org/web/20010411115938/www.saleslogix.com/home/index.php3celli . . . as printed on Aug. 30, 2005, Apr. 2000, pp. 19 pages.
ServiceObjects, "DOTS Web Services—Product Directory", downloaded from http://www.serviceobjects.com/products/directory_of_web_services.asp, 4 pages, Aug. 17, 2006.
ServiceObjects, "Real-Time Customer Intelligence for a Nickel", downloaded from http://www.serviceobjects.com/products/default.asp, 3 pages, Aug. 17, 2006.
Steele, Georgia, Pipeline Software Tracks Process; Tired of Dealing with Lead Generation Firms, CitiPacific Mortgage has built a tool that will allow Mortgage Originators to Track Leads in an Integrated Sales and Marketing Approach, Broker Magazine, Mar. 2006, vol. vol. 8, Issue 2, pp. 26, New York.
Stein, Benchmarking Default Prediction Models: Pitfalls and Remedies in Model Validation, Moody's KMV, Revised Jun. 13, 2002, Technical Report #020305; New York.
Sumner, Anthony, "Tackling the Issue of Bust-Out Fraud", Retail Banker International, Jul. 24, 2007, pp. 4.
Tao, Lixin; "Shifting Paradigms with the Application Service Provider Model"; Concordia University, Canada; IEEE; Oct. 2001.
TARGUSinfo: "Intermark Media Slashes Returned Lead Costs, Improves Affiliate Relations," downloaded from www.targusinfo.com, 2007, pp. 4.
TARGUSinfo: Lead Verification, Verify Your Leads With Unique Accuracy and Ease, downloaded from www.targusinfo.com/solutions/verify/Default.asp, as printed Aug. 1, 2006, pp. 1.
TARGUSinfo: Solutions: Services: Verify Express—Verify, Correct and Enhance Customer Provided Data, http://www.targusinfo.com/solutions/services/verify/ Oct. 28, 2005, 27 pgs.
The Center for Financial Services Innovation, A Case Study of Checking Account Inquiries and Closures in Chicago, Nov. 2006.
Thoemmes, Felix; "Propensity Score Matching in SPSS"; Center for Educational Science and Psychology, University of Tubingen; Jan. 2012.
Truston, "Checking if your child is an ID theft victim can be stressful," as posted by Michelle Pastor on Jan. 22, 2007 at http://www.mytruston.com/blog/credit/checking_if_your_child_is_an_id_theft_yi.html.
Vamosi, Robert, "How to Handle ID Fraud's Youngest Victims," Nov. 21, 2008, http://news.cnet.com/8301-10789_3-10105303-57.html.
W.A. Lee, American Banker: The Financial Services Daily, Experian, On Deal Hunt, Nets Identity Theft Insurer, Jun. 4, 2003.

(56) References Cited

OTHER PUBLICATIONS

Web Decisions, "Live Decisions", downloaded from http;//www.webdecisions.com, 2 pages, Sep. 18, 2006.
"Why Should You Use LeadVerifier?", LeadVerifier, https://web.archive.org/web/20051105043240/www.leadverifier.com/LeadVerifier_Why.asp, as archived Nov. 5, 2005, pp. 2.

* cited by examiner

SYSTEM AND METHOD OF OPTIMIZING MATCHING OF LEADS

CROSS-REFERENCE TO RELATED APPLICATIONS

This application is a continuation of U.S. patent application Ser. No. 14/820,231, filed Aug. 6, 2015, which is a continuation of U.S. patent application Ser. No. 13/073,878, filed Mar. 28, 2011, and claims the benefit of U.S. Patent Provisional Application No. 61/330,285, filed Apr. 30, 2010, the entire contents of which are hereby expressly incorporated by reference herein in their entirety and for all purposes. In addition, any and all applications for which a foreign or domestic priority claim is identified in the application data sheet as filed with the present application are also expressly incorporated by reference.

BACKGROUND

The invention relates to the field of computer systems. In particular, it relates to a computer system for matching leads with providers of goods or services such as, for example, credit products.

Service providers and vendors, such as banks, credit unions, automobile dealers, and the like, offer loan and credit products to their customers. These products may include automobile loans, home mortgage loans, personal loans, student loans, credit cards, and other such financial products. Those products may often fluctuate over time, so that interest rates, down payment amounts, loan criteria, and other parameters may vary from day to day. Additionally, service providers may offer a variety of products to consumers with different criteria. For example, loans at different interest rates may be offered to consumers with better or worse credit ratings, consumers at different income levels, consumers of different ages or occupations, and so on.

Traditionally, in order to find a loan or credit product, a consumer would shop around at various providers to compare the rates or products that each provider was willing to offer. Additionally, service providers may have used mass marketing techniques to advertise their products to potential new clients. However, such techniques have limited effectiveness, because they tend to flood consumers with information, making the decision-making process difficult and inefficient.

SUMMARY

As a result, what is needed are systems and methods for automatically optimizing the matching of consumers to service providers and vendors, to ensure that interested consumers are matched to service providers offering products with criteria that are met by the interested consumers, and preferably identifying multiple service providers in order to offer the consumer with a choice of service providers. An automated system has the advantage that it can, in real time, retrieve up-to-date product pricing and rate information and, to the extent possible, provide results to the user of the system without significant delay, thus resulting in a desirable user experience.

In one embodiment, a system for matching consumers with vendors includes a processor, a network interface in communication with the processor, a data storage device in communication with the processor, and computer-executable instructions stored in computer storage. The instructions are configured, when executed by the processor, to cause computer hardware to perform operations comprising: (1) matching a consumer lead comprising information about a consumer with one or more vendors selected from a set of vendors identified in data records stored on the data storage device; (2) sending, via the network interface, the lead to the matched vendors; (3) receiving a real-time indication of a rejection from one of the matched vendors; (4) matching the lead with a replacement vendor; and (5) sending the lead to the replacement vendor.

In one embodiment, a method for matching consumers with vendors includes the steps of: (1) using a computer processor to match a consumer lead comprising information about a consumer with one or more vendors selected from a set of vendors identified in data records stored on a data storage device in communication with the computer processor; (2) sending, via a network interface in communication with the computer processor, at least a portion of the lead to the matched vendors; (3) receiving a real-time indication of a rejection from at least one of the matched vendors; (4) using the computer processor to match the lead with at least one replacement vendor; and (5) sending, via the network interface, the lead to the replacement vendor.

This Summary section does not define or limit the invention. Rather, it provides a concise summary of only some embodiments. The inclusion of particular components, features, or method steps in this Summary section does not indicate, suggest, or imply that those components, features, or method steps are required in every embodiment of the invention. Similarly, the description of particular components, features, or method steps in the Detailed Description section does not indicate, suggest, or imply that those components, features, or method steps are required in every embodiment of the invention. The claims define the scope of the invention.

DETAILED DESCRIPTION

Various embodiments of the invention will now be described, with reference to the accompanying figures.

Figure 1:
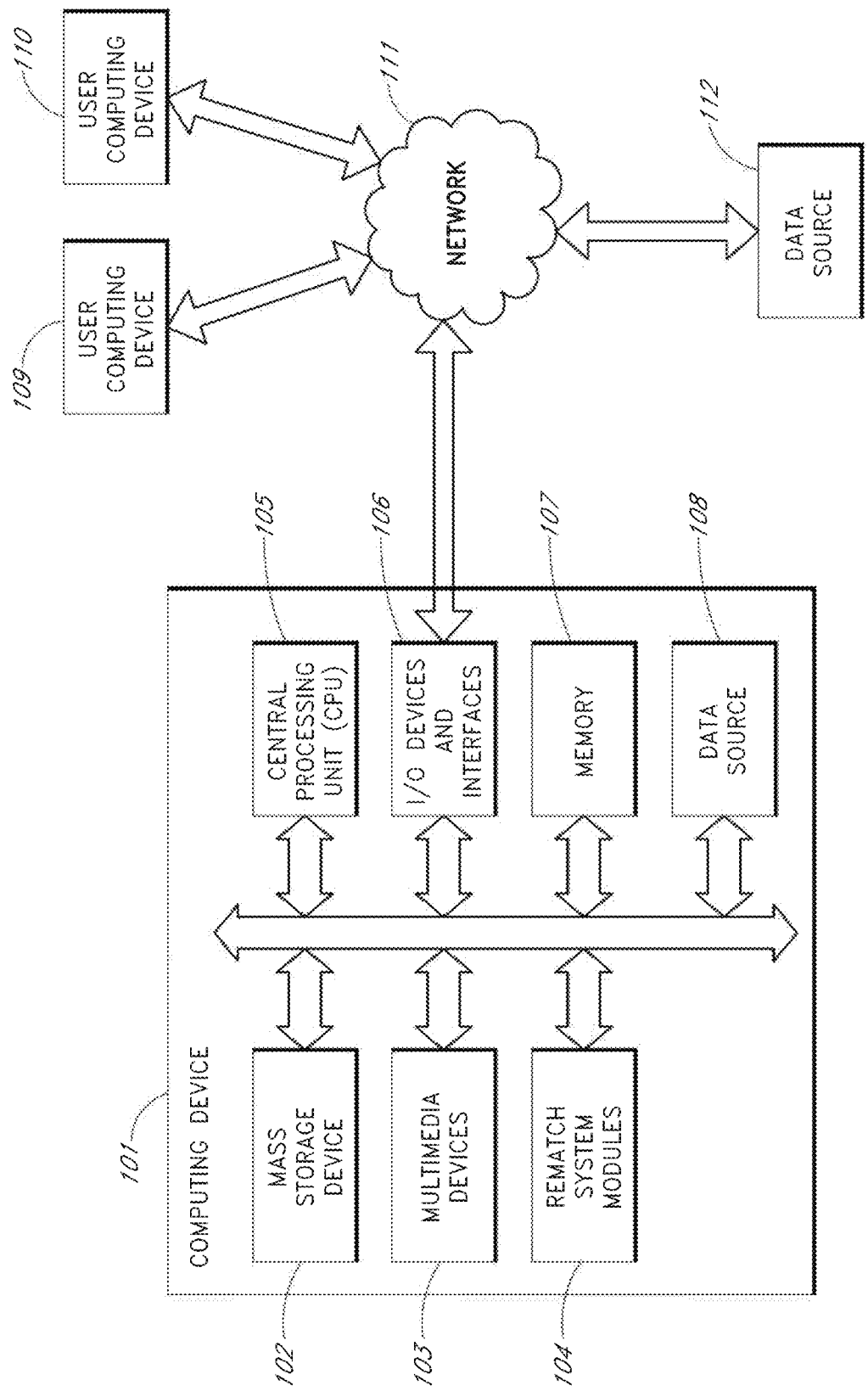
FIG. 1 shows computing hardware and software included in computer systems included in embodiments of the invention.

An embodiment of a computer system configured to operate embodiments of the invention is depicted in FIG. 1. In one embodiment, the system described herein runs on one or more computing devices 101. Moreover, in some embodiments, the features of the system are available via a fully-hosted application service provider that manages and provides access to the system, for example, via a web interface or other interface. In other embodiments, the system may be available via partially hosted ASPs or other providers. In additional embodiments, the system may be accessed through a broad assortment of interface channels, including XML, fixed format data inquiry, batch or a comprehensive and easy-to-use web browser user interface. In yet further embodiments, the system may be a customer-side installed solution and may be included and/or in direct communication with one or more third party systems.

The system includes one or more software modules 104. In general, the words "module," "function," and similar terms, as used herein, refer to logic embodied in hardware or firmware, or to a collection of computer-executable software instructions, possibly having entry and exit points, written in a programming language, such as, for example, Java, C or C++. The computer-executable instructions of a software module are generally stored in computer-readable storage on a tangible medium, such as, for example, a compact disc, a hard disk drive, a flash drive, or the like. The computer-executable instructions define operations that are performed by computer hardware when the instructions are executed by a computer processor. A software module may be compiled and linked into an executable program installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the computing devices 101 include and/or communicate with a database module or data source 108 or 112. The database module or data source may be implemented using one or more databases, such as a relational database, such as Sybase, Oracle, CodeBase and Microsoft® SQL Server as well as other types of databases, such as, for example, a flat file database, an entity-relationship database, and object-oriented database, and/or a record-based database. The database may be operated on the same computing device or devices as other modules 108, or they may be operated on different computing devices 112. In some embodiments, some or all of the databases are operated by an entity different from the entity operating the analysis. The databases may be operated by an independent service provider.

In one embodiment, each of the computing devices are IBM, Macintosh, or Linux/Unix compatible. In another embodiment, the computing devices comprise a server, a laptop computer, a cell phone, a personal digital assistant, a kiosk, an interactive voice response device, a voice response unit, or an audio player, for example. In one embodiment, the computing devices include one or more CPUs 105, which may each include microprocessors. The computing devices may further include one or more memory devices 107, such as random access memory (RAM) for temporary storage of information and read only memory (ROM) for permanent storage of information, and one or more mass storage devices 102, such as hard drives, diskettes, or optical media storage devices. In one embodiment, the modules are in communication via a bus system, such as, for example, a bus system using a Peripheral Component Interconnect (PCD, Microchannel, SCSI, Industrial Standard Architecture (ISA) or Extended ISA (EISA) architecture. In some embodiments, components of the computing devices communicate via a network, such as a local area network that may be secured.

The computing devices are generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing devices may be controlled by a proprietary operating system. Conventional operating systems control and schedule computer processes for execution, perform memory management, provide file system, networking, and I/O services, and provide a user interface, such as a graphical user interface ("GUI"), among other things.

The computing devices may include one or more commonly available input/output (I/O) devices and interfaces 106, such as a keyboard, mouse, touchpad, microphone, and printer. Thus, in one embodiment the computing devices may be controlled using the keyboard and mouse input devices, while in another embodiment the user may provide voice commands to the computing devices via a microphone. In one embodiment, the I/O devices and interfaces include one or more display device, such as a monitor, that allows the visual presentation of data to a user. More particularly, a display device provides for the presentation of GUIs, application software data, and multimedia presentations, for example. The computing devices may also include one or more multimedia devices, such as speakers, video cards, graphics accelerators, and microphones, for example.

In one embodiment, the I/O devices and interfaces provide a communication interface to various external devices and the communications medium via wired or wireless communication links. For example, the computing devices may be configured to communicate with the communications medium using any combination of one or more networks 111, including LANs, WANs, or the Internet, for example, via a wired, wireless, or combination of wired and wireless communication links. The communication links thus enable the computing devices to communicate with, among other things, external user computing devices 109 and 110.

Figure 2:
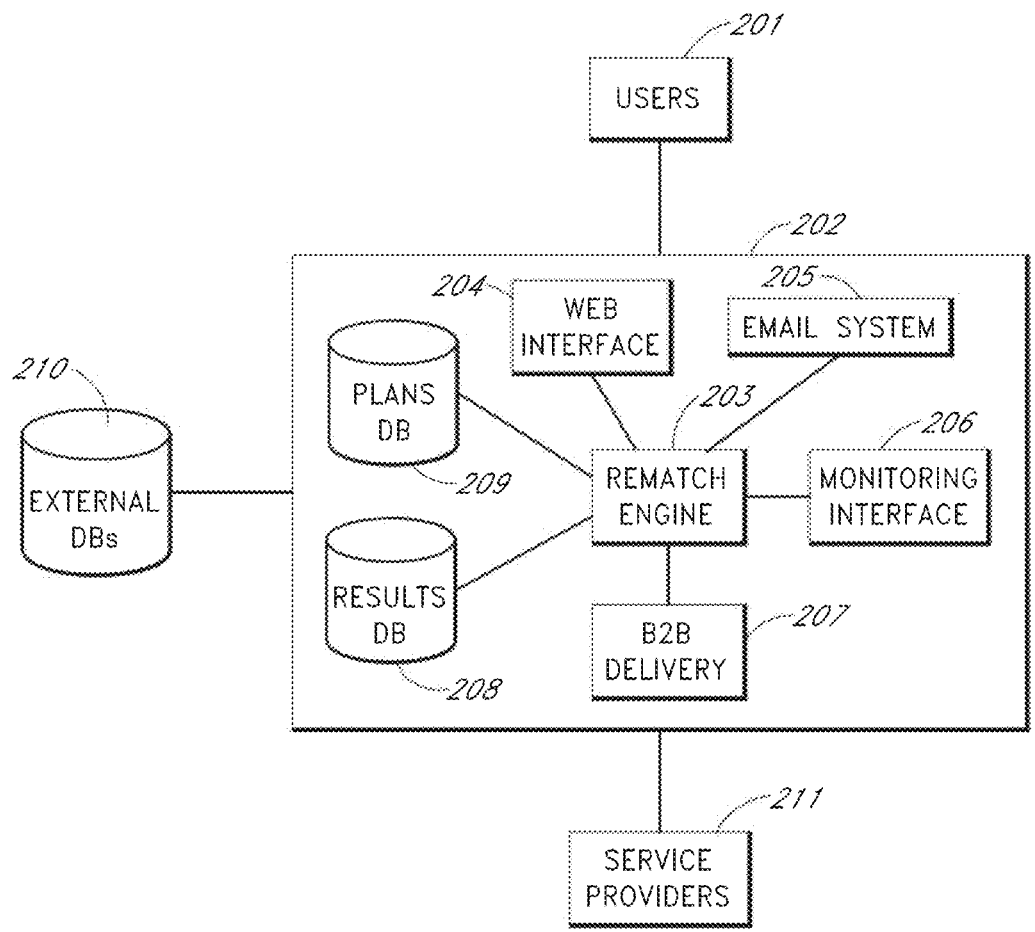
FIG. 2 shows another view of computing hardware and software included in computer systems included in embodiments of the invention.

An embodiment of a computer system in accordance with one embodiment is shown in FIG. 2. A rematch system 202 includes computing hardware and software configured to perform the methods disclosed herein. The system 202 may include a single processor or multiple processors, and may be entirely contained in a single computing device or distributed among multiple computing devices connected via a network. It will be understood that any of the components of system 202 described herein may be operated within the system 202 or external to the system. It will also be understood by one of ordinary skill in the art that any of the disclosed components may be removed from the system, or other components may be added to it, as are known generally within the art.

In an embodiment, the system 202 includes a rematch engine 203. The rematch engine is configured to perform the rematching methods described in this specification, including, for example, those described with reference to FIG. 3. The rematch engine may be embodied in executable code stored in volatile or non-volatile storage media within the system 202, and it utilizes various other modules included on that system.

In an embodiment, the system 202 includes a web interface 204 configured to serve web pages to users 201 wishing to use the system. The web interface 204 also receives inputs from users and provides those inputs to the rematch engine 203, to be used for the rematching methods. For example, the inputs received from the web interface 204 may be used to generate leads based on personal information provided by users 201. The web interface may be configured to communicate over a public network such as the Internet, or over a private network such as a LAN. In addition or alternatively to web interface 204, embodiments of the invention may include other interfaces for communicating with users 201, such as an email interface, an audio interface, a touch-tone telephone system, or other similar interfaces known to those of ordinary skill in the art. Furthermore, although the web interface or other interfaces may be used to receive personal information from users directly, this need not be the only source of personal information about users. The system 202 may access internal databases or external databases to gather demographic information, credit records, addresses, or other personal information relating to users. This "external" personal information may be gathered, for example, by identifying matching records against personal information provided by the user.

Another interface used by the system 202 for communicating with users in an embodiment is email system 205. This email system receives data from the rematch engine 203 to be sent out to users 201 who connect to the system. In some embodiments, the rematch engine 203 provides the email system 205 with results from performing a loan rematching method, and the email system 205 composes an email based on those results to be sent to the appropriate user. Those of ordinary skill in the art will understand that other methods of communicating those results to users may be employed in addition or alternatively to the email system 205, including, for example, a web-based system, a telephone system, a text messaging system, an instant messaging system, or the like. Additionally, the email system or other communication system may be configured to send out information to users immediately, or it may batch multiple communications and send them out on a periodic basis, such as every few minutes.

An embodiment includes monitoring interface 206, which is configured to monitor the performance and activities of the rematch engine 203. The monitoring interface 206 may record information including requests from users coming in from the web interface 204, outgoing communications through the email system 205, communications with the B2B delivery system 207, communications with databases 208, 209, and/or 210, or other processes or algorithms performed by the rematch engine 203. The monitoring interface may store its results in one or more log files, it may email the results to system administrators, or it may process the monitoring results in other ways known to those of skill in the art.

In an embodiment, the system 202 includes a Business-to-Business (B2B) delivery system configured to transmit data between the rematch engine 203 and various service providers 211. The B2B delivery system 202 communicates via a network interface, which may be the same network interface as used by the web interface 204 and email system 205, or any or all of them may use separate network interfaces. The B2B delivery system 207 may transmit information about leads to service providers 211, who offer various loan or credit products such as auto loans, credit cards, mortgages, or similar products, in which users 201 may be interested. In that respect, the B2B delivery system 207 may employ specialized protocols to communicate with service providers 211, or it may employ standard network protocols such as HTTP.

In an embodiment, the rematch engine 203 and/or other components of the system 202 may utilize one or more databases. For example, a results database 208 may be used to store the results of the rematch methods performed by the rematch engine 203. Also a plans database 209 may be used to store information about service providers 211 and various plans and products offered by those service providers. Databases may be internal to the system, or they may be external such as external databases 210, which may be external because they are hosted by a company different from the one operating the rematch system 202, or for other reasons such as efficiency. Any of the databases may be of various types of databases, including a SQL database or other relational database, a flat or hierarchical structure of files, a single flat-file store, a key-value mapping system, or other forms of data storage known to those of ordinary skill in the art.

An embodiment includes plans database 209. This plans database may include information about products offered by service providers 211, the products being, for example, loan offerings, credit cards, mortgages, or similar products. Although this specification generally discusses products being loans such as auto loans, it is contemplated that the products may be other products, such as goods and/or services. In an embodiment, the plans in the plans database 209 include criteria for whether a person qualifies for a particular plan. The criteria may be based on, for example, a person's credit score or credit history, personal information, demographic information, or other information about the individual. A service provider may offer only a single plan or may offer multiple plans which may have different criteria. This is useful, for example, to support different plans for people meeting different criteria, such as people having different credit scores, as a service provider would then be able to offer, for example, auto loans with different rates based on credit scores. Additionally, plans may be associated with a bounty value, that is, an amount that the service provider associated with the plan is willing to pay to an operator of the rematch engine in exchange for the rematch engine providing the service provider with a set of requested personal information about an individual, otherwise known as a lead. It may be the case that the service provider is willing to pay a bounty value if the rematch engine identifies a lead matching the criteria of the plan. The bounty value may be fixed, or it may be adjusted depending on the nature of the lead or on other factors.

Although plans may be stored in a database such as plans database 209, plans need not be stored in a database. In an embodiment, plans are dynamically received from service providers upon a request from the rematch system 202 to the service providers 211. For example, upon receiving a request from a user 201, the rematch engine may transmit some personal information about the user to some or all of the service providers 211. Such "dynamic" plans may only have identifying information stored in the database sufficient to inform the rematch engine that the service provider should be contacted in order to retrieve the full specification of the plans, or may have additional information but still require further data from the service provider before they can be fully considered. One use for dynamic plans, for example, is for plans where the pricing or other factors such as interest rates for the plans are highly volatile. The dynamic plan scheme would allow for the rematch engine to retrieve the most up-to-date pricing or rates for those plans at the time of the user request.

In one embodiment, as part of determining the bounty that each service provider is willing to pay for a lead, the system may transmit some of the information contained in the lead to multiple service providers in order to obtain an instant bid from those service providers. Preferably, in such embodiments, the lead information sent to the service providers includes enough information to allow the service provider to determine the value of the lead to the service provider without providing enough information to the service provider to allow the service provider to contact the consumer associated with the lead. For example, the lead information may include general information about the type of good or service desired by the consumer and information about the consumer, such as income, credit score, and the like, that may assist the service provider in determining the value of the lead, but may not include the name of the consumer or contact information of the consumer. Preferably, each service provider has an automated system, which may include software, for processing the lead information, for generating a bid of what the service provider is willing to pay for the lead, and for transmitting the bid to the matching system as part of an electronic message. The system may then take service provider bids into account in the process of matching the consumer leads to service providers. Such a system for receiving bids may be known as an instant bid or ping-post system.

Figure 3:
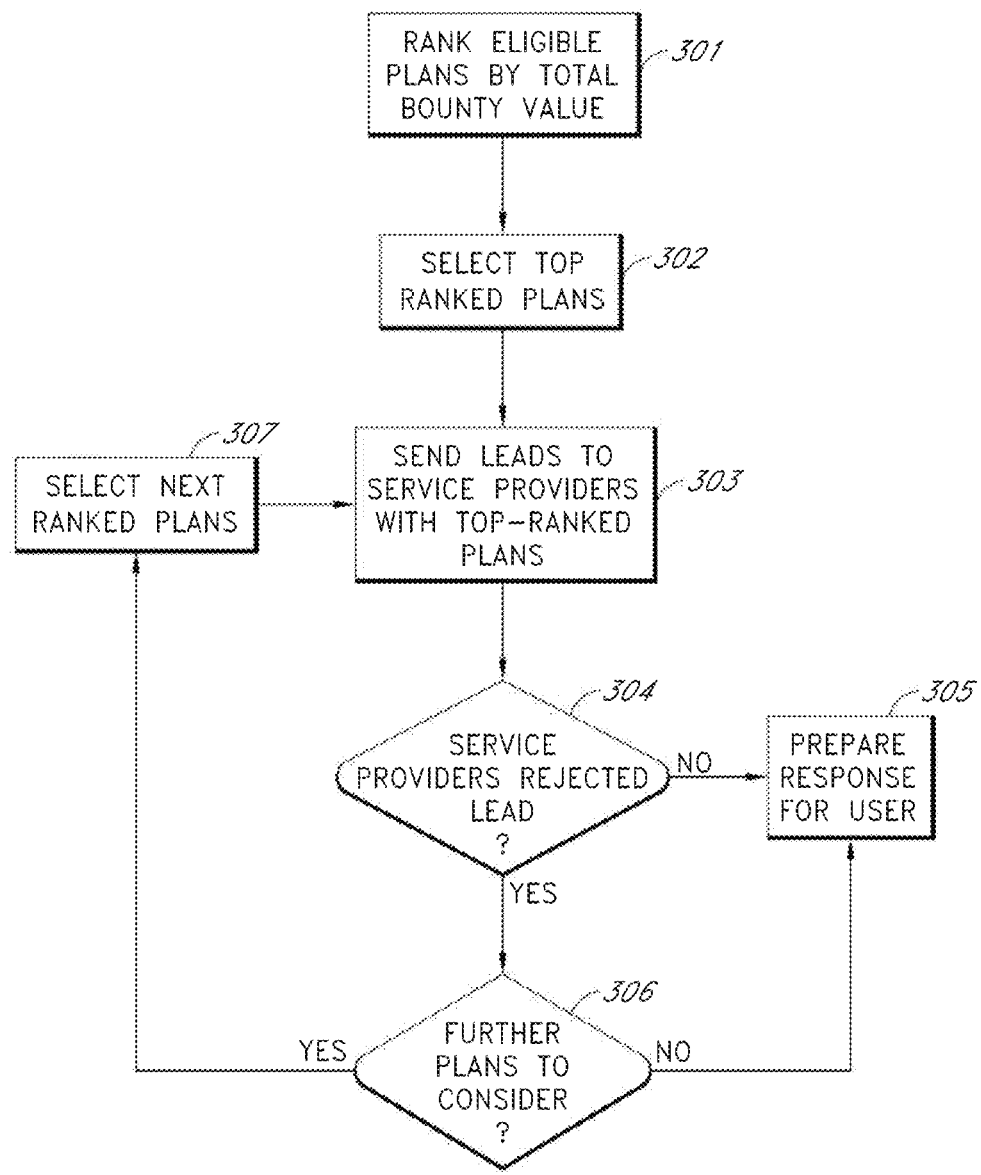
FIG. 3 is a flowchart of a method of matching plans to leads, as performed according to embodiments of the invention.

A method performed by an embodiment is shown in FIG. 3. In an embodiment, the method is performed in real time when a user submits a request to the rematch system, but in other embodiments the method may be performed, for example, during a periodic batch operation.

In accordance with this method, eligible plans are first ranked at step 301. In an embodiment, plans are ranked by total bounty value. The bounty value may be determined based upon information previously submitted by service providers or may be determined based upon an instant bid or ping-post system, as previously described. Other factors may be used to rank plans, however, such as the closeness of the match between the user, the reliability of the associated service provider, the frequency or infrequency of use of the service provider, or other factors, or a combination of factors.

At step 302, the top-ranked plans are selected for processing. In various embodiments, the number of plans selected may be one plan or a fixed number of plans, or plans may be selected based on a threshold value based on the rankings. Although the method of FIG. 3 and other related methods throughout this specification can be understood to refer to processing a single plan at a time, it will be understood by those of skill in the art that multiple plans could be processed in serial or in parallel.

At step 303, leads are sent to service providers associated with the top-ranked plans selected from step 302. In an embodiment, the leads are sent via the B2B delivery system. The leads are generally constructed by the rematch system to include appropriate personal information required by the service providers. As a result, the leads may follow a standard format, or they may vary by each service provider depending on that service provider's requirements. In an embodiment, the lead is formatted using a standard file format such as XML, in order to facilitate interoperability of systems.

In one embodiment, the sending of leads to service providers comprises sending a complete lead to the service providers. As used herein, a complete lead is one that contains sufficient consumer information that a service provider is able to contact the consumer associated with the lead in order to offer to provide the good or service desired by the consumer. Alternatively, the sending of leads to service providers comprises sending a partial lead that includes information to allow the service providers to accept or reject the lead. In such embodiments, the complete lead may be sent to those service providers that accept the lead, and may not be sent to any service providers that reject the lead. Sending the complete lead only to those service providers that accept the lead may advantageously reduce abuses of the system, such as, for example, rejecting a lead but still contacting the consumer in order to offer to provide the good or service desired by the consumer.

At step 304, the system determines whether any service providers have rejected the lead. In one embodiment, the system makes this determination, at least in part, by receiving electronic messages from service providers indicating whether each service provider accepts or rejects the lead. Preferably, each service provider has a lead response module that is configured to determine, upon receipt of the lead by the service provider, whether the lead is acceptable to the service provider. Preferably, a service provider's lead response module performs automated operations, such as checking whether the lead meets internal criteria, to determine whether the lead is acceptable. A service provider may reject a lead for a number of reasons, including, for example, that the lead is a duplicate of a lead that the service provider already has, that the lead matches or fails to match one or more filters, that a threshold number of leads matching a particular profile have already been identified (the lead profile has "capped out"), or some other reason. Preferably, a service provider's lead response module is configured to accept or reject a lead nearly instantaneously, such that lead rejections can be received by the system sufficiently quickly so that the system can match the lead with another service provider that will accept the lead quickly enough to inform the user which service providers the user has been matched with substantially without delay and without interruption to the user's browsing session. In addition, it is preferable that the rematching process is completed without the user knowing or suspecting that a lead has been rejected by a service provider.

Generally, a service provider can accept a lead or reject it, and the service provider may or may not provide a reason for rejecting the lead. Preferably, the service provider accepts or rejects the lead by sending an electronic message to the system that indicates acceptance or rejection. If a lead is rejected, the rejection message may include a rejection code that indicates a reason for the rejection, but such a code is not required. Alternatively or additionally, the system may be designed to tolerate errors on the service provider's side that may cause the system to not receive any response from the service provider. In one embodiment, the system is configured with a timeout, and if a response is not received before the timeout, then the service provider is treated as having provided no response. In one embodiment, nonresponses are treated as rejections. Alternatively, nonresponses may be treated as acceptances. Some embodiments of the system may be equipped to process a response that is received after a timeout, such as, for example, by sending a lead to an additional matched service provider when the system receives an acceptance from that service provider after the timeout period, or performing a supplemental match of another service provider when the system receives a rejection from a matched service provider after the timeout period. It will be appreciated, however, that some embodiments may not process responses received after a timeout period because such processing may be disruptive. For example, in some cases it is desirable to notify the user of all of the matched service providers during the user's live session, and a user may have already terminated his or her live session when a response is belatedly received by the system. Thus, while it is advantageous in some embodiments to provide for processing of delayed responses, it is not a requirement of every embodiment.

If, at step 304, the service providers accept the lead, then the method proceeds to step 305, where a response is prepared for the user. The response, in this case, may indicate that the various plans matched, and it may contain information about the service providers and the plans to which the user was matched. The response may also provide contact information for the service providers. The response may be provided by a variety of communication media. In one embodiment, the response is provided by displaying a web page to the user during the user's live session. Advantageously, such a response provides immediate information to the user regarding which service providers have been matched with the user. However, in other embodiments in which such immediate response is not as important, the response may be provided by email or other means. Thus, the user can be provided with real-time feedback where appropriate, but is not constrained to wait for a web page to load in the case that the method takes longer than desirable to execute.

If, on the other hand, one or more of the service providers reject the lead or otherwise do not accept it at step 304, the system proceeds to determine if there are further plans to consider, at step 306. In general, these would be plans that fell lower in the rankings than the originally selected plans. However, in some embodiments it is possible for multiple plans to have the same rank and, in such embodiments, the newly selected plans may have the same rank as at least one of the originally selected plans. In cases in which multiple plans have the same rank, the system may break ties by random selection or by another method.

If there are no further plans to consider, then the method proceeds to step 305, where a response is prepared for the user. In this case, if no plans were matched to the user, the user is provided with appropriate information. In an embodiment, the user is provided with default information relating to the requested type of product that the user was seeking. For example, if the user was looking for an auto loan but did not match any auto loans, the user may be provided with a general advertisement for auto loans. Of course this default information need not be displayed only when no plans were matched to the user; instead, the default information may be displayed at any appropriate time.

If there are further plans to consider at step 306, then the method proceeds to select the next most highly ranked plans, at step 307. In an embodiment, only a sufficient number of plans are selected to fill in the number of plans that were rejected at step 304. In this way, the number of matched plans will not exceed a certain maximum number. Once those alternate plans are selected, the method returns to step 303 to perform rematching on those plans. Thus, in an embodiment, the matching process continues until a sufficient number of plans are matched to the user or the list of plans is exhausted. In other embodiments, other conditions may be used to determine when to terminate the rematching process, including, for example, a timeout.

Because the rematching process may iterate multiple times, a response to the user may be prepared optionally either only once after the process completes, or at various times during the process. For example, the user may be notified once the first iteration of the rematching process completes and then receive updates whenever additional products are matched to the user.

In preferred embodiments, the system provides users with real-time responses. However, in some circumstances, real-time responses may not be provided because more time may be needed to receive responses from the service providers. For example, if a user is visiting the rematch system via a web interface, the user may not be willing to wait for a long period of time to receive a response. However, the service providers may require longer than the user is willing to wait, to respond to the rematch system. In order to solve this problem, a method such as the one shown in FIG. 4 may be employed in certain embodiments.

Figure 4:
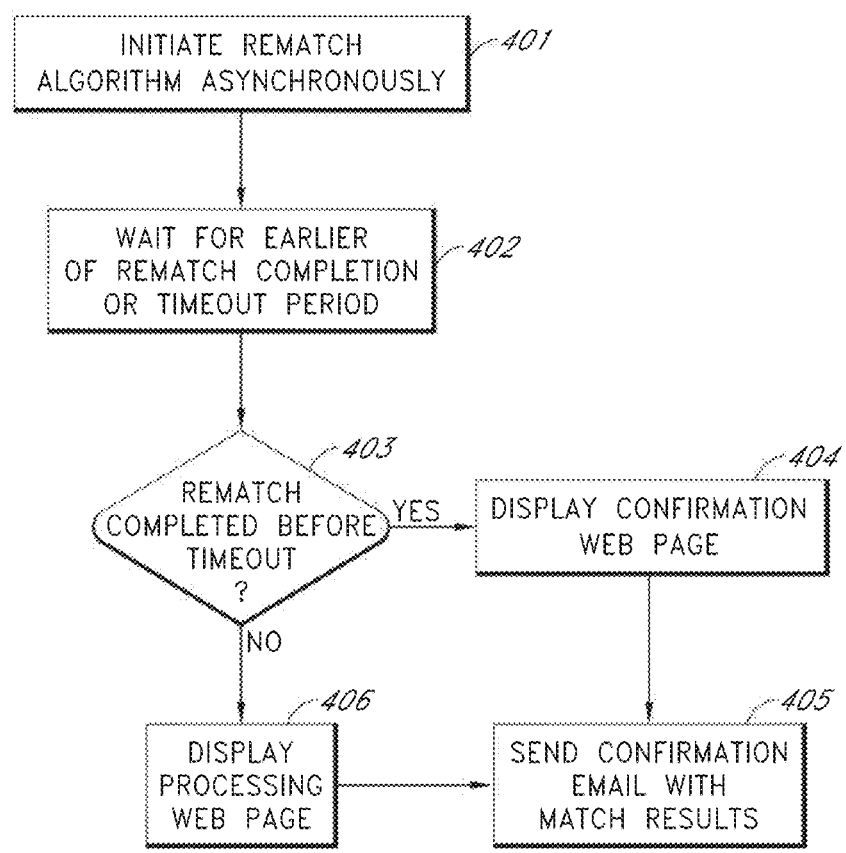
FIG. 4 is a flowchart of a method of managing asynchronous processes, as performed according to embodiments of the invention.

In accordance with the method of FIG. 4, a rematch method or algorithm is initiated in an asynchronous manner, at step 401. For example, the rematch method may be initiated in a separate thread or run on a separate processor or computer system. Alternately, the rematch process may be executed on a single thread, but an interrupt may be provided for on the processor on which the process is executing, to provide an asynchronous signal during that process's execution.

At step 402 a computer processor waits for the earlier of the completion of the rematch process or the expiration of a timeout period. The timeout period expiration may be detected by a thread running independently on the rematch system, or it may be detected based on a processor interrupt. The method next determines, at step 403, whether the rematch process completed before the timeout period expired. If the rematch process did complete, then a web page may be transmitted to the user confirming the results of the rematch process, at step 404. Additionally, at step 405, a confirmation email with the match results may be transmitted to the user. The contents of this email and web page may depend on the results of the rematch process.

If, at step 403, it is determined that the rematch process did not complete before the timeout period expired, then at step 406, a processing page is transmitted to the user. The processing page may be used to indicate that the rematch process is still ongoing, and it may include partial results. In this way, regardless of whether the rematch process completes before the timeout period, the user may be sent a real-time notification that their request is being processed. After the processing web page is displayed, a confirmation email may be sent to the user at step 405 indicating the status and/or results of the rematch process. The email may be sent after the entire rematch process completes, or one or more emails may be sent to keep the user apprised as to the status of the request.

In an alternate embodiment, the real-time processing described above may be performed by installing code throughout the rematch engine. The installed code would be configured to detect, when it is executed, whether a timeout period has expired. If the timeout period has expired when that code is run, then the code may provide similar notifications to the user and it may then cause the rematch engine to branch to executing a different portion of instructions to complete the execution of the rematching process. In this way, the rematching engine is also not prematurely terminated, but the user is able to receive a realtime response to the submitted request.

Figure 5:
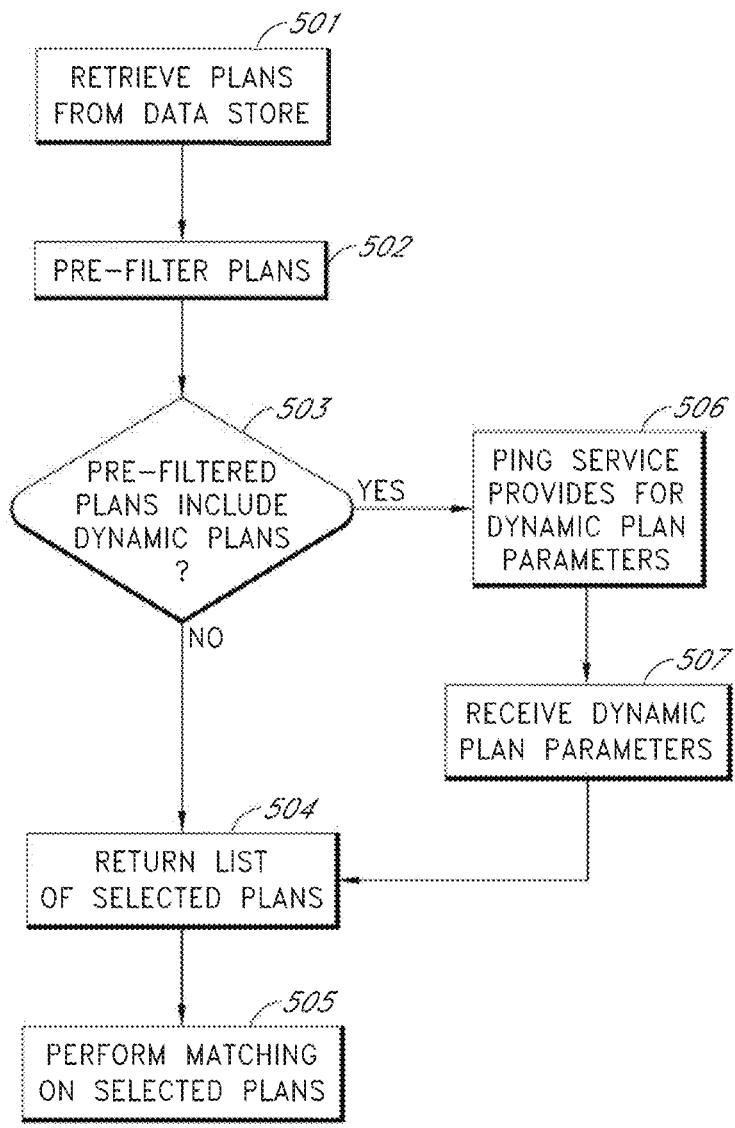
FIG. 5 is a flowchart of a method of selecting plans, as performed according to embodiments of the invention.

A method of identifying plans to be used for some embodiments of the rematching process is shown in FIG. 5. In accordance with this method, plans are retrieved from a data store, at step 501. Next, at step 502, the plans are pre-filtered. The pre-filtering step may involve, for example, comparing any criteria included in each plan with personal information received from a user via a web or other interface. Other criteria may be used for pre-filtering, such as information about the service provider associated with the plan; criteria requested by the user such as a requested type of plan, location of the service provider, or other such criteria; and other information. The result of pre-filtering in step 502 is a "mix" of plans to be considered with respect for the user initiating the request.

At step 503, the mix of plans is inspected to determine if any of those plans are dynamic plans. As explained previously, the information for a dynamic plan is retrieved from a service provider. If there are no dynamic plans in the mix, then the list of plans may be directly returned to the rematch engine, at step 504. However, if there are dynamic plans to be considered, then the method proceeds to step 506, in which the corresponding service providers are pinged for dynamic plan parameters. This ping process may be performed over the B2B delivery system, using a protocol agreed upon between the rematch system and the service provider. In response, the dynamic plan parameters are sent back to the rematch system, at step 507. Once the rematch system receives those parameters, it adds the dynamic plans to the mix of plans, and the full set of plans can be returned at step 504. The set of selected plans is then used to perform matching at step 505, in accordance with the various methods described herein, such as with regard to FIG. 3.

Figure 6:
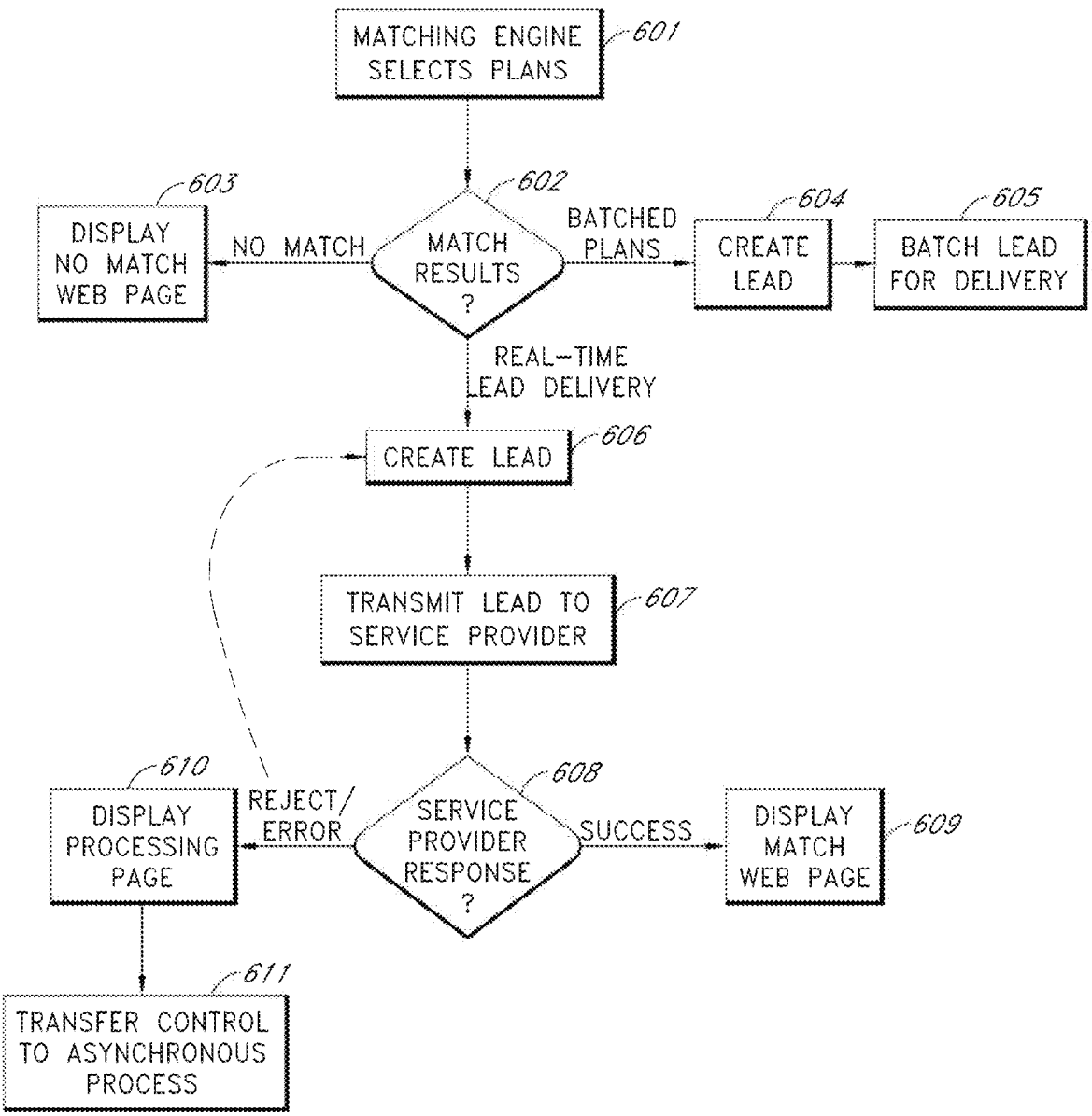
FIG. 6 is a flowchart of a method of matching plans to leads in real time, as performed according to embodiments of the invention.
Figure 7:
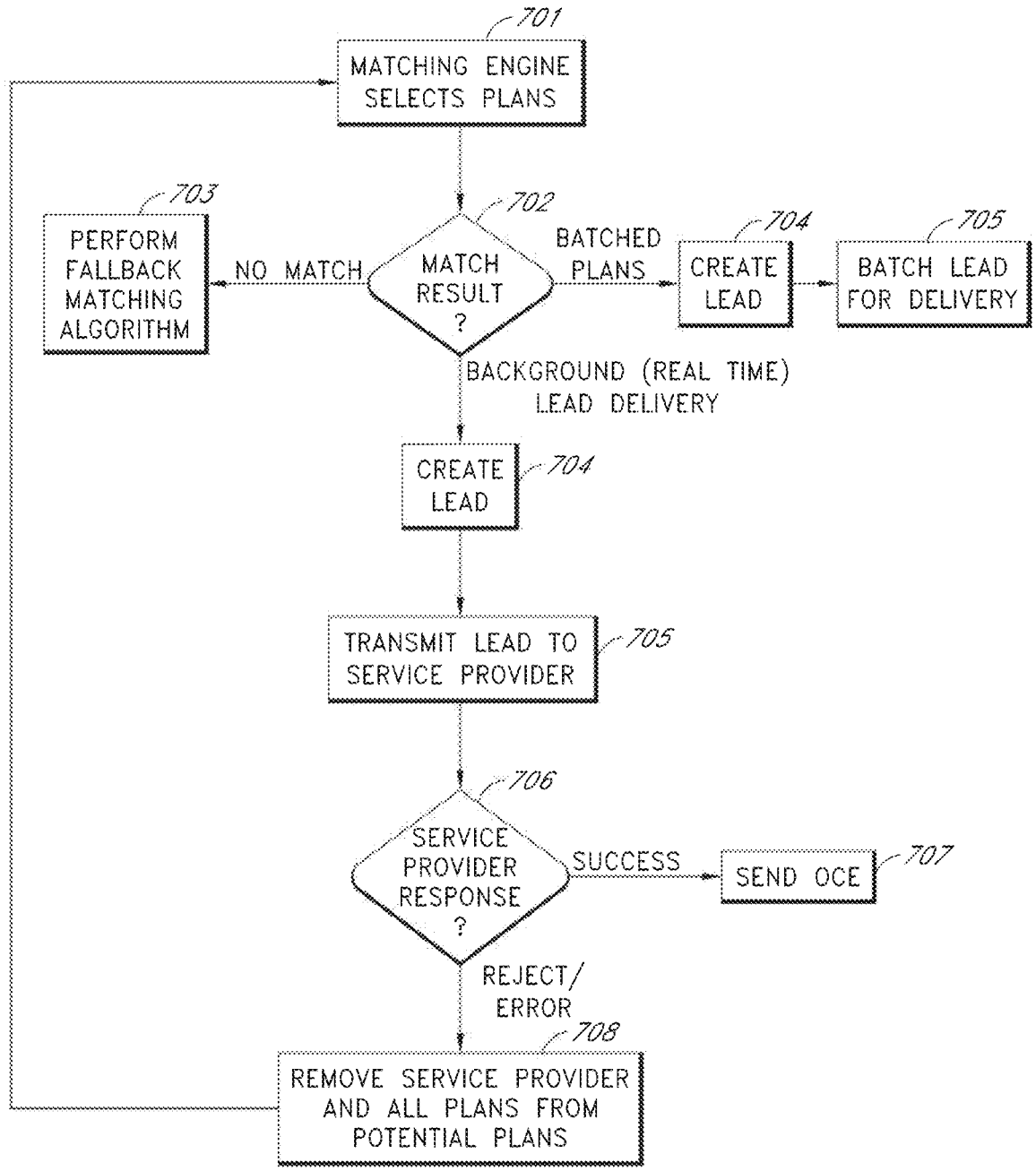
FIG. 7 is a flowchart of a method of matching plans to leads m a background process, as performed according to embodiments of the invention.
Figure 8:
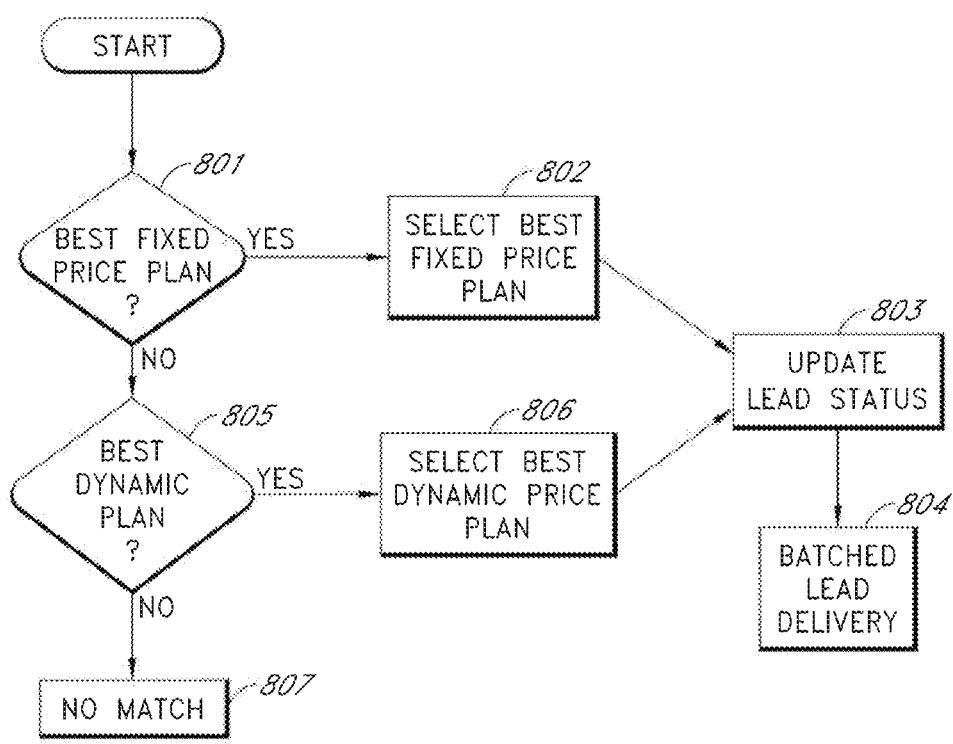
FIG. 8 is a flowchart of a fallback method of matching plans to leads, as performed according to embodiments of the invention.

FIGS. 6-8 show various embodiments that elaborate upon the general method described above with regard to FIG. 3 of rematching leads to service providers. FIG. 6 depicts the initial method performed in an embodiment, when a user request is received. At step 601 the matching engine selects plans, according to a method such as that described with respect to FIG. 5. At step 602, the selected plans are analyzed. If no plans are selected, then the method proceeds to step 603, where a default web page is displayed to the user. As described previously, this default web page may contain general information or advertisements relating to the type of product that the user was seeking, such as a general auto loan advertisement. Alternatively, at step 603, a fallback matching algorithm may be used, such as that described with regard to FIG. 8.

If some or all of the matched plans are indicated as "batched plans," then the matching engine understands this to mean the service provider has requested that those plans are to be sent in batches at regular time intervals. In this case, the method may proceed to step 604, where leads are created for the selected plans. The leads include personal information about the requesting user, based on information received about the user from either the user directly or other external or internal data sources. Once the leads are prepared, then they may be batched and queued for delivery at step 605. They may be batched with other leads to be sent to the same service provider, in order to provide for compact network transactions. The delivery may occur at specified time intervals, and may be performed in accordance with an automated scheduling system such as a cron daemon. Additionally, once this is done, the user may be notified by email or web page response of the resulting activity.

If the determination at step 602 indicates that some or all of the plans are to have leads delivered in real time, then the system proceeds to step 606 for real-time delivery of leads. The rematch engine determines the best plan, based on total bounty value of that plan or other factors, as described previously. It then creates a lead based on information about the user, and at step 607, the lead is transmitted to the appropriate service provider via the B2B delivery system or other means. The system then awaits a response from the service provider at step 608, and it makes a determination based on the response received.

If the lead is successfully matched, then the method proceeds to step 609 and a match web page may be displayed. Additional information may be communicated to the user by email. If the service provider rejects the lead or an error such as a timeout is otherwise detected, then the method may proceed to step 610, where a processing web page is transmitted to the user, as described previously. Then, at step 611, control is transferred to an asynchronous or background process, such as that described in FIG. 7. Alternatively, instead of proceeding directly to step 610, the method may return to step 606 and apply the next best plan according to total bounty value or other criteria. It is noted that this method may optionally be used in conjunction with a timeout method such as the one described with reference to FIG. 4, to transfer control to an asynchronous process after an appropriate amount of time has elapsed.

If a rematching process is unable to complete prior to a specified timeout, then in an embodiment, an asynchronous or background process may be performed such as that shown in FIG. 7. An asynchronous process would be run separately from the web request, so that the response to the web request would not be delayed from transmission to the user. The asynchronous process may be employed if the methods described above, such as those described with respect to FIGS. 5-6, do not complete in time; in those cases, this method is entered at the appropriate place corresponding to where the other method was executing when the timeout occurred.

At step 701, the list of selected plans is received. At step 702, the selected plans are analyzed. If no plans are selected, then a fallback matching algorithm is employed, at step 703. One such fallback algorithm is described with respect to FIG. 8. In the alternative, a default message such as an email may be sent to the requesting user. The default email, as described above, may include default advertisements or information.

If some or all of the selected plans are batch plans, then in a manner analogous to that described above, leads are created at step 704 and the leads are batched for delivery at step 705. If some of the plans are indicated to have leads delivered in real time, then the method proceeds to step 704, where the best plan is selected and a lead is generated for that plan. At step 705, the created lead is transmitted via the B2B delivery system to the appropriate service provider. At step 706, the system awaits a response from the service provider. If the lead is successfully matched, then an order confirmation email (OCE) or other communication is sent to the user, indicating that the selected plan matched.

If on the other hand, the service provider rejects the lead or otherwise causes an error, then the method proceeds to step 708. At this step, the service provider and all plans associated with that service provider may be removed from the mix of potential plans. This may be done on the assumption that if one lead for a service provider did not match, then other leads are likely not to match for the same service provider. This may also be the case if the service provider is sent the lead not in conjunction with any particular plan but the service provider is sent the lead generally to determine if it has any matching plan. In alternate embodiments, only the non-matching plan is removed, but other plans from the same service provider are retained. It will be understood that, in other methods and processes described throughout this specification, the failure of a lead to match for a given service provider may result in the rematch engine not considering other plans for that same service provider.

After the appropriate plans are removed from the mix in step 708, the method may return to step 701 or step 704 to start the rematch process and attempt to match the next best lead. Because this process is asynchronous, it may continue on for as long as necessary, if that is desirable, until a sufficient number of leads are matched or until the list of selected plans is exhausted. Other considerations, such as the need to conserve network or processor resources, may be reason in some embodiments not to allow the rematch process to continue on until full completion.

If no plans are selected for consideration by the rematch engine, then some embodiments may employ a fallback matching procedure such as that described in FIG. 8. According to this procedure, a best fixed price plan is first identified at step 801. A fixed price plan is a non-dynamic plan; that is, it is a product for which the parameters do not need to be retrieved from a service provider. The determination of which fixed price plan is best may be made based on a variety of factors, such as total bounty value, closeness of match with the requesting user, characteristics of the service provider, and so on. Once the best fixed price plan is selected at step 802, then a lead status for a lead generated for the user can be updated based on this selected fixed-price plan at step 803, and the lead can be batched and queued for delivery at step 804.

If no best fixed price plan exists, then the method proceeds to identify the best dynamic plan, at step 805. The dynamic plan may be selected according to criteria as described above. If a best dynamic plan is identified, then the best dynamic plan is selected at step 806, and the method proceeds to step 803 to have the lead status updated and then to step 804 to have the lead batched and queued for delivery. On the other hand, if no best dynamic plan is identified, then the method concludes with no match, at step 807. At that point, the method may take no further actions, or the user may be notified that no match could be found. The user notification may be sent based on whether a previous notification was already sent to the user, in order to avoid sending duplicate or redundant messages.

In this disclosure, the use of the phrase "service provider" should not be interpreted strictly to suggest that the systems and methods disclosed herein cannot be used to match consumers with vendors of goods, as opposed to services. Rather, it will be understood by a skilled artisan that the systems and methods disclosed herein can match consumers with vendors of goods, services, or both. Thus, the phrase "service provider" herein is used interchangeably with the term "vendor," and should be interpreted broadly to include any vendor that sells (or rents) goods, provides a service, or both.

Figure 9:
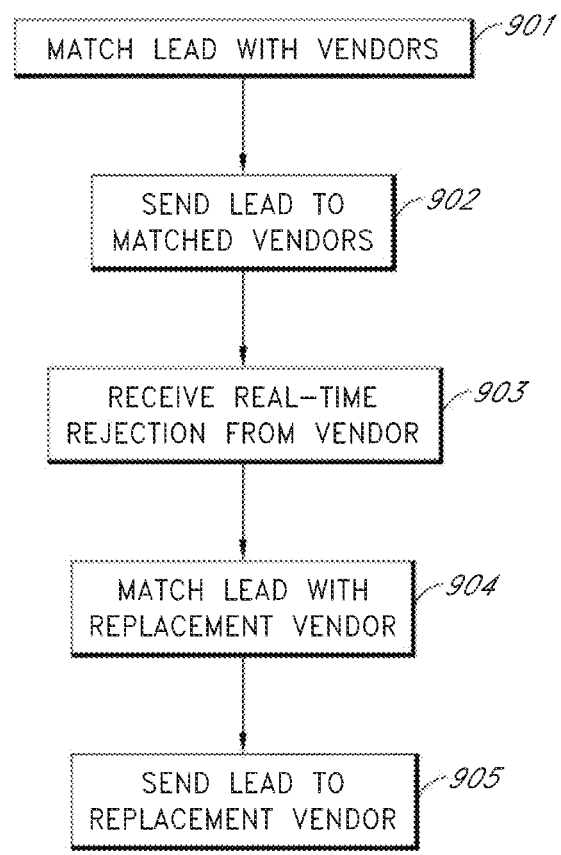
FIG. 9 is a flowchart of a method of matching plans to leads, as performed according to embodiments of the invention.

In an embodiment, a rematch method is performed as shown in FIG. 9. This method may be performed on a rematch engine as part of a rematch system. At step 901, a lead is matched with one or more vendors. The lead is generated based on information received about a particular individual. The information received may originate from an online interface, or it may come from other sources such as third-party data sources, external or internal databases, or the like. The lead, as described elsewhere in this specification, includes personal information of interest to the vendors in determining whether or not to offer a particular loan or credit product to the particular individual. In some embodiments, the lead may be matched to multiple vendors, in order to take advantage of parallel processing; in other embodiments only one vendor is matched. The vendors may be matched based on various criteria described throughout this specification, including, for example, a total bounty value associated with the particular vendor or with a plan provided by that particular vendor, or based on other criteria.

Next, at step 902, the generated lead is sent to the vendors to which the lead was matched. The lead may be sent using a B2B delivery system over a network, to be received at the vendors' server or other computer. This allows the vendor's server to perform additional processing to determine how to handle the lead. In an embodiment, the vendor's server is configured to respond to the lead in an efficient manner, so that the response is received within a certain period of time to allow for real-time delivery of leads on the rematch engine's end. However, the processing done on the vendor's server may be out of the control of the rematch engine or the operator of the rematch system, so it may not always be the case that the vendor's server may be configured to provide a response within a certain amount of time.

At step 903, a real-time rejection is received from a vendor. The rejection may be indicated in a status code sent in accordance with a protocol used by the B2B delivery system. Alternately, the vendor may indicate an error in processing the lead, or it may fail to respond, causing the rematch engine to determine that a timeout has occurred. The vendor may include a reason or explanation for why it rejected the lead. In some embodiments, the system may use the reason for rejection to improve further matching, such as by removing other selected plans or vendors that are likely or certain to reject the lead for the same or similar reasons.

At step 904, a replacement vendor is identified in response to the rejection being received. It need not be the case that every vendor to which the lead was sent during step 902 reject the lead before step 904 is performed; rather a replacement vendor may be identified if one or more of the vendors reject the lead, even while other vendors accept it. This allows for a full set of vendors to be matched to the lead, thus ensuring a high bounty return to the operator of the rematch engine. The replacement vendor may be identified based on various criteria described previously, such as a total bounty value associated with a plan for that vendor. At step 905, the lead is sent to the replacement vendor. In an embodiment, the lead is sent using the B2B delivery system as described previously.

Although particular embodiments have been described generally and in detail throughout this specification, it is not intended that the invention be limited to the particular embodiments described herein. Those of ordinary skill in the art will understand that modifications may be made to any part or the whole of the disclosed embodiments, and that elements of the embodiments may be combined or removed within the spirit of the invention. Accordingly, the invention should not be construed as limited by the foregoing disclosure, but rather should be understood as having the scope specified by the claims that follow.

What is claimed is:

1. A method comprising:
during execution of a consumer browsing session on a first consumer device associated with a first consumer:
transmitting, by a network interface to the first consumer device for display on a display screen, electronic interactive user interface data configured to prompt the first consumer for lead information that includes personal information associated with the first consumer and is stored on one or more data storage devices;
receiving, by the network interface in connection with one or more hardware computer processors, the lead information comprising a request for a matching of a first consumer with one or more vendors of a plurality of vendors, wherein the network interface is configured to communicate with:
consumer devices comprising the first consumer device associated with the first consumer,
vendor devices comprising a first vendor device associated with a first vendor, and a second vendor device associated with a second vendor, and
a third-party device associated with a third-party database, wherein the third-party device is different from the vendor devices;
accessing, by the network interface in connection with the one or more hardware computer processors, supplemental data associated with the first consumer from the third-party device;
generating, by the one or more hardware computer processors, a lead comprising a first consumer lead profile based at least in part on the lead information and the supplemental data;
determining, by the one or more hardware computer processors, a vendor ranking score for each of the plurality of vendors;
matching, by the one or more hardware computer processors, the first consumer lead profile with two or more vendors from the plurality of vendors based at least in part on the vendor ranking score, wherein the matching two or more vendors includes at least the first vendor and the second vendor;
generating, by the one or more hardware computer processors, a partial lead profile associated with the first consumer lead profile;
sending, by the network interface in connection with the one or more hardware computer processors, the partial lead profile to the first vendor device, wherein the partial lead profile comprises information that is insufficient to contact the first consumer;
receiving, by the network interface in connection with the one or more hardware computer processors, a first electronic message that includes an indication of a rejection of the partial lead profile from the first vendor device;
sending, by the network interface in connection with the one or more hardware computer processors, the partial lead profile to the second vendor device;
receiving, by the network interface in connection with the one or more hardware computer processors, a second electronic message that includes an indication of an acceptance of the partial lead profile from the second vendor device; and
transmitting, by the network interface in connection with the one or more hardware computer processors and for display on the display screen associated with the first consumer device, electronic interactive user interface data configured to notify the first consumer of the second vendor being a match, wherein the transmitting occurs during the consumer browsing session.

2. The method of claim 1, wherein matching the first consumer lead profile with the one or more vendors comprises calculating bounty values for each of the one or more vendors, wherein the bounty values are calculated based at least in part on the lead information that includes personal information associated with the first consumer.

3. The method of claim 1, further comprising:
sending information to the first consumer device based on responses received from the one or more vendors.

4. The method of claim 1, wherein matching the first consumer lead profile with the one or more vendors comprises identifying a dynamic plan associated with one of the vendors of the one or more vendors and retrieving information relating to the dynamic plan from the one or more data storage devices, wherein the information is associated with the dynamic plan and comprises pricing information.

5. The method of claim 1, wherein the plurality of vendors are each associated with a plurality of plans stored on the one or more data storage devices, wherein each plan comprises one or more matching criteria.

6. The method of claim 5, wherein each of the plurality of plans comprises a bounty value.

7. The method of claim 5, wherein at least a first plan of the plurality of plans is a dynamic plans comprising identifying information associated with an external third party service provider, wherein the one or more hardware computer processors is further configured to:
contact, by the network interface, the external third party service provider associated with the first plan; and
retrieve, by the network interface from the external third party service provider, real-time pricing information associated with the first plan.

8. The method of claim 1, wherein the vendor ranking score is based at least in part on one or more of: a determined closeness of a match between each of the plurality of vendors and the first consumer lead profile; reliability of each of the plurality of vendors; or frequency of use of each of the plurality of vendors.

9. The method of claim 1, wherein the first electronic message comprises a rejection code that indicates a reason for the rejection.

10. The method of claim 1, wherein sending the partial lead profile to the second vendor device is executed in response to receiving the first electronic message from the first vendor device.

11. A privacy protection lead matching system, the system comprising:
a network interface configured to communicate with:
consumer devices comprising a first consumer device associated with the first consumer,
vendor devices comprising a first vendor device associated with a first vendor, and a second vendor device associated with a second vendor, and
a third-party device associated with a third-party database, wherein the third-party device is different from the vendor devices;
one or more data storage devices configured to store:
consumer lead profiles including a first consumer lead profile associated with the first consumer;
a plurality of computer-executable instructions;
one or more hardware computer processors, in communication with the one or more data storage devices, when executing the plurality of computer executable instructions, is configured to, during execution of a consumer browsing session on the first consumer device associated with a first consumer:
- transmitting, by a network interface to the first consumer device for display on a display screen, electronic interactive user interface data configured to prompt the first consumer for lead information that includes personal information associated with the first consumer and is stored on one or more data storage devices;
- receive, by the network interface in connection with one or more hardware computer processors, the lead information comprising a request for a matching of a first consumer with one or more vendors of a plurality of vendors;
- access, by the network interface in connection with the one or more hardware computer processors, supplemental data associated with the first consumer from the third-party device;
- generate, by the one or more hardware computer processors, a lead comprising the first consumer lead profile based at least in part on the lead information and the supplemental data;
- determine, by the one or more hardware computer processors, a vendor ranking score for each of the plurality of vendors;
- match, by the one or more hardware computer processors, the first consumer lead profile with two or more vendors from the plurality of vendors selected from the vendor list based at least in part on the vendor ranking score, wherein the matching two or more vendors includes at least the first vendor and the second vendor;
- generate, by the one or more hardware computer processors, a partial lead profile associated with the first consumer lead profile;
- send, by the network interface in connection with the one or more hardware computer processors, the partial lead profile to the first vendor device, wherein the partial lead profile comprises information that is insufficient to contact the first consumer;
- receive, by the network interface in connection with the one or more hardware computer processors, a first electronic message that includes an indication of a rejection of the partial lead profile from the first vendor device;
- sending, by the network interface in connection with the one or more hardware computer processors, the partial lead profile to the second vendor device;
- receiving, by the network interface in connection with the one or more hardware computer processors, a second electronic message that includes an indication of an acceptance of the partial lead profile from the second vendor device; and
- transmit, by the network interface in connection with the one or more hardware computer processors and for display on the display screen associated with the first consumer device, electronic interactive user interface data configured to notify the first consumer of the second vendor being a match, wherein the transmitting occurs during the consumer browsing session.

12. The computer system of claim 11, wherein the one or more hardware computer processors are further configured to:
transmit, by the network interface in connection with the one or more hardware computer processors, data relating to the one or more vendors that indicate acceptance of a lead, wherein the transmitted data is based at least in part on a determination of whether a timeout expired after sending the partial lead profile to a portion of the one or more vendors.

13. The computer system of claim 11, wherein matching the first consumer lead profile with the one or more vendors comprises calculating bounty values for each of the one or more vendors, wherein the bounty values are calculated based at least in part on the lead information that includes personal information associated with the first consumer.

14. The computer system of claim 11, further comprising sending information to the first consumer device based on responses received from the one or more vendors.

15. The computer system of claim 11, wherein matching the first consumer lead profile with the one or more vendors comprises identifying a dynamic plan associated with one of the vendors of the one or more vendors and retrieving information relating to the dynamic plan from the one or more data storage devices, wherein the information is associated with the dynamic plan and comprises pricing information.

16. The computer system of claim 11, wherein the plurality of vendors are each associated with a plurality of plans stored on the one or more data storage devices, wherein each plan comprises one or more matching criteria.

17. The computer system of claim 16, wherein each of the plurality of plans comprises a bounty value.

18. The computer system of claim 11, wherein the vendor ranking score is based at least in part on one or more of: a determined closeness of a match between each of the plurality of vendors and the first consumer lead profile; reliability of each of the plurality of vendors; or frequency of use of each of the plurality of vendors.

19. The computer system of claim 11, wherein the first electronic message comprises a rejection code that indicates a reason for the rejection.

20. A non-transitory computer readable medium having software instructions stored thereon, the software instructions executable by a hardware computer processor to cause a computing system to perform operations comprising:
during execution of a consumer browsing session on a first consumer device associated with a first consumer:
- transmitting, by a network interface to the first consumer device for display on a display screen, electronic interactive user interface data configured to prompt the first consumer for lead information that includes personal information associated with the first consumer and is stored on one or more data storage devices;
- receiving, by the network interface in connection with one or more hardware computer processors, the lead information comprising a request for a matching of a first consumer with one or more vendors of a plurality of vendors, wherein the network interface is configured to communicate with:
  - consumer devices comprising the first consumer device associated with the first consumer,
  - vendor devices comprising a first vendor device associated with a first vendor, and a second vendor device associated with a second vendor, and
  - a third-party device associated with a third-party database, wherein the third-party device is different from the vendor devices;
- accessing, by the network interface in connection with the one or more hardware computer processors, supplemental data associated with the first consumer from the third-party device;

generating, by the one or more hardware computer processors, a lead comprising a first consumer lead profile based at least in part on the lead information and the supplemental data;

determining, by the one or more hardware computer processors, a vendor ranking score for each of the plurality of vendors;

matching, by the one or more hardware computer processors, the first consumer lead profile with two or more vendors from the plurality of vendors based at least in part on the vendor ranking score, wherein the matching two or more vendors includes at least the first vendor and the second vendor;

generating, by the one or more hardware computer processors, a partial lead profile associated with the first consumer lead profile;

sending, by the network interface in connection with the one or more hardware computer processors, the partial lead profile to the first vendor device, wherein the partial lead profile comprises information that is insufficient for the first vendor to contact the first consumer;

receiving, by the network interface in connection with the one or more hardware computer processors, a first electronic message that includes an indication of a rejection of the partial lead profile from the first vendor device;

sending, by the network interface in connection with the one or more hardware computer processors, the partial lead profile to the second vendor device;

receiving, by the network interface in connection with the one or more hardware computer processors, a second electronic message that includes an indication of an acceptance of the partial lead profile from the second vendor device; and transmitting, by the network interface in connection with the one or more hardware computer processors and for display on the display screen associated with the first consumer device, electronic interactive user interface data configured to notify the first consumer of the second vendor being a match, wherein the transmitting occurs during the consumer browsing session.

* * * * *

UNITED STATES PATENT AND TRADEMARK OFFICE
CERTIFICATE OF CORRECTION

PATENT NO. : 11,430,009 B2
APPLICATION NO. : 16/573821
DATED : August 30, 2022
INVENTOR(S) : Doug Leteux, Kanaya J. Nagdev and Dmitry Kuzmenko Page 1 of 1

It is certified that error appears in the above-identified patent and that said Letters Patent is hereby corrected as shown below:

On the Title Page

At Page 4, Column 2 (Item (56) U.S. Patent Documents), Line 16, Delete "McCamey" and insert -- McCarney --.

At Page 5, Column 2 (Item (56) Other Publications), Line 15, Delete "=cache.q" and insert -- =cache:q --.

In the Claims

In Claim 11, at Column 17, Lines 28-29, Delete "selected from the vendor list".

In Claim 20, at Column 19, Line 21, Delete "for the first vendor".

Signed and Sealed this
Twenty-second Day of November, 2022

Katherine Kelly Vidal
*Director of the United States Patent and Trademark Office*